(12) United States Patent
Aiba et al.

(10) Patent No.: US 10,032,300 B2
(45) Date of Patent: *Jul. 24, 2018

(54) IMAGE PROCESSING APPARATUS AND IMAGE PROCESSING METHOD

(71) Applicant: Sony Corporation, Tokyo (JP)

(72) Inventors: Masayuki Aiba, Kanagawa (JP); Hiroaki Eto, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,979

(22) Filed: Apr. 24, 2017

(65) Prior Publication Data

US 2017/0228908 A1 Aug. 10, 2017

Related U.S. Application Data

(63) Continuation of application No. 15/278,624, filed on Sep. 28, 2016, now Pat. No. 9,665,964, which is a
(Continued)

(30) Foreign Application Priority Data

Sep. 11, 2014 (JP) ................................. 2014-185588

(51) Int. Cl.
*G09G 5/00* (2006.01)
*G06T 11/60* (2006.01)
*G06T 5/00* (2006.01)

(52) U.S. Cl.
CPC ............. *G06T 11/60* (2013.01); *G06T 5/007* (2013.01); *G06T 2207/20208* (2013.01); *G06T 2207/20212* (2013.01)

(58) Field of Classification Search
None
See application file for complete search history.

(56) References Cited

U.S. PATENT DOCUMENTS 6,317,128 B1 11/2001 Harrison et al.
2006/0104533 A1 5/2006 Daly et al.
(Continued)

FOREIGN PATENT DOCUMENTS

JP 2001333350 A 11/2001
JP 2003324756 A 11/2003
(Continued)

OTHER PUBLICATIONS

International Search Report for PCT Application PCTJP2015066257, dated Aug. 25, 2015.
(Continued)

*Primary Examiner* — David H Chu
(74) *Attorney, Agent, or Firm* — Lerner, David, Littenberg, Krumholz & Mentlik, LLP

(57) ABSTRACT

To display images by suitably superimposing a graphics image on a high-dynamic-range image in an easily visible manner. GOEA dynamic range converter (311) converts a SDR graphics image to an HDR graphics image based on metadata. An image combiner (312) combines the graphics image of which the dynamic range has been converted to HDR with HDR content. A dynamic range converter (313) performs display mapping on the HDR content combined with the graphics image based on metadata.

19 Claims, 26 Drawing Sheets

Related U.S. Application Data continuation of application No. 14/771,258, filed as application No. PCT/JP2015/066257 on Jun. 4, 2015, now Pat. No. 9,501,855.

(56) References Cited

U.S. PATENT DOCUMENTS

| | | |
|---|---|---|
| 2012/0147953 A1 | 6/2012 | El-Mahdy et al. |
| 2012/0218290 A1 | 8/2012 | Waschbuesch et al. |
| 2012/0256943 A1 | 10/2012 | Atkins et al. |
| 2014/0253581 A1 | 9/2014 | Nobori |
| 2016/0216072 A1* | 7/2016 | McNeil .................... F41G 3/02 |

FOREIGN PATENT DOCUMENTS

| | | |
|---|---|---|
| JP | 2005-318491 A | 11/2005 |
| JP | 2009081617 A | 4/2009 |
| JP | 2010-087661 A | 4/2010 |
| JP | 2010268332 A | 11/2010 |
| JP | 2011053468 A | 3/2011 |
| JP | 2011223054 A | 11/2011 |
| JP | 2014-502480 A | 1/2014 |
| WO | 2013046095 A1 | 4/2013 |
| WO | 2015005189 A1 | 1/2015 |

OTHER PUBLICATIONS

Extended European Search Report for EP Application No. 15840104.2 dated Feb. 22, 2018.

* cited by examiner

IMAGE DISPLAY SYSTEM 100

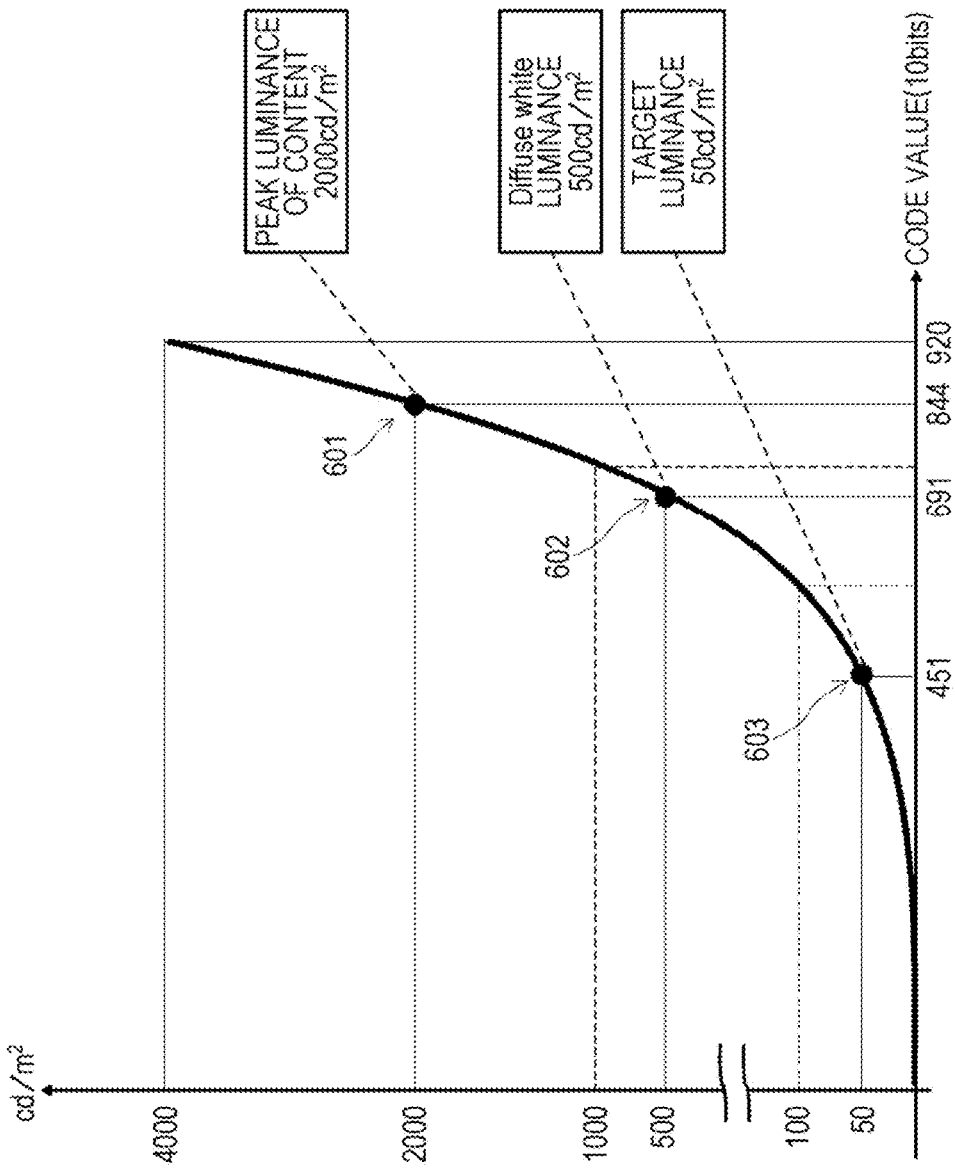

FIG. 7

| knee_function_info(payloadSize){ | Descriptor |
|---|---|
| 701 — knee_function_id | ue(v) |
| 702 — knee_function_cancel_flag | u(1) |
| if(!knee_function_cancel_flag){ | |
| 703 — knee_function_persistence_flag | u(1) |
| 704 — mapping_flag | u(1) |
| 705 — input_d_range | u(32) |
| 706 — input_disp_luminance | u(32) |
| 707 — output_d_range | u(32) |
| 708 — output_disp_luminance | u(32) |
| 709 — num_knee_points_minus1 | ue(v) |
| 710 — for(i=0; i<=num_knee_points_minus1; i++){ | |
| 711 — input_knee_point[i] | u(10) |
| 712 — output_knee_point[i] | u(10) |
| } | |
| } | |
| } | |

knee_function_info SEI 700

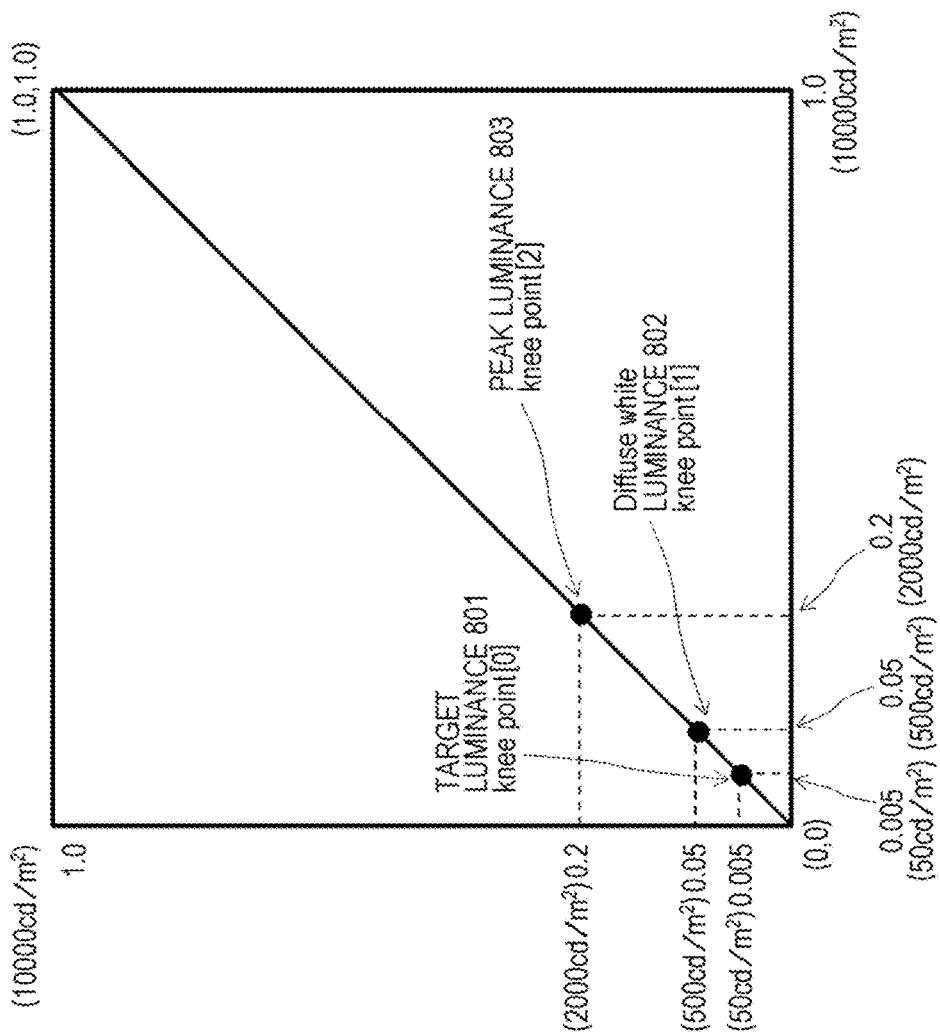

Lhdr100: HDR 100% REFERENCE LUMINANCE
Ldc: Diffuse White LUMINANCE

IMAGE PROCESSING APPARATUS AND IMAGE PROCESSING METHOD

CROSS-REFERENCE TO RELATED APPLICATIONS

The present application is a continuation of U.S. patent application Ser. No. 15/278,624, filed on Sep. 28, 2016, which is a continuation of U.S. patent application Ser. No. 14/771,258, filed on Aug. 28, 2015 (U.S. Pat. No. 9,501,855), which application is a national phase entry under 35 U.S.C. § 371 of International Application No. PCT/JP2015/066257 filed Jun. 4, 2015, which claims priority from Japanese Patent Application No. 2014-185588 filed Sep. 11, 2014, all of which are incorporated herein by reference.

TECHNICAL FIELD

The techniques disclosed in the present specification relates to an image processing apparatus and an image processing method for processing image information, and more particularly, to an image processing apparatus and an image processing method for displaying images by superimposing a graphics image on a high-dynamic-range image.

BACKGROUND ART

In recent years, with an increase in the number of bits that an imaging device (image sensor) can process, high-dynamic-range (HDR) images have been produced. The dynamic range of images can be generally expressed by the ratio between the minimum luminance and the maximum luminance. HDR images have a contrast ratio (for example, 10000:1 or higher) between maximum and minimum lightness colors and can express the real-world scenes. HDR images can record all luminance values in the visible range and can support the dynamic range and color gamut equivalent to the human visual characteristics. HDR images provide advantages such as the abilities to express shades realistically, simulate exposures, and express glare.

For example, HDR content is provided in an ultra high definition Blu-ray (registered trademark) Disc (UHD-BD), a webcasting service such as OTT (over-the-top), and a digital broadcasting service.

Families who watch content have displays with different performance such as a display capable of displaying standard dynamic range (SDR) images of which the dynamic range is compressed approximately by ¹⁄₄₀ and an HDR-compatible display having the maximum luminance of 500 nit or 1000 nit. Thus, a process (hereinafter referred to also as "display mapping") of adjusting the dynamic range of original content to the performance of an output destination display of the images is required (for example, see Patent Document 1).

In display mapping, if the dynamic range is converted just by linear scaling, a large amount of information may be lost, and for example, the appearance of a person may be greatly different from a source image to a result image. Such a loss of information is contrary to the intention of a content producer or supplier.

A graphics image such as menus or an on-screen display (OSD) operated by users is often displayed by being superimposed on a content screen. When a graphics image generated in SDR is combined with HDR content, if the graphic image is displayed as it is without luminance conversion, the graphic image appears dark and it becomes difficult to see the image. If the luminance of the graphic image is just linearly scaled, the graphic image appears too bright.

CITATION LIST

Patent Document

Patent Document 1: JP 2014-502480 A

SUMMARY OF THE INVENTION

Problems to be Solved by the Invention

An object of the techniques disclosed in the present specification is to provide an excellent image processing apparatus and method capable of displaying images by suitably superimposing a graphics image on a high-dynamic-range image in an easily visible manner.

Solutions to Problems

A technique disclosed in the present specification has been made in view of the above problems, and a first aspect thereof is an image processing apparatus including: a metadata acquiring unit that acquires metadata of image data; and a processor that processes a graphics image to be superimposed on the image data based on the metadata.

According to a second aspect of the technique disclosed in the present specification, in the image processing apparatus according to the first aspect, the metadata acquiring unit acquires a Diffuse White luminance indicating a luminance value of white serving as a reference of the image data as the metadata, and the processor adjusts a luminance of the graphics image based on the Diffuse White luminance.

According to a third aspect of the technique disclosed in the present specification, in the image processing apparatus according to the second aspect, the processor compares the Diffuse White luminance with a reference luminance of a display that displays the image data and adjusts the luminance of the graphics image based on the larger luminance information.

According to a fourth aspect of the technique disclosed in the present specification, in the image processing apparatus according to the third aspect, the processor adjusts the luminance of the graphics image based on the reference luminance of the display when the metadata acquiring unit is unable to acquire the Diffuse White luminance of the image data.

According to a fifth aspect of the technique disclosed in the present specification, in the image processing apparatus according to the second aspect, the processor compares the Diffuse White luminance with a reference luminance of a dynamic range of a predetermined luminance and adjusts the luminance of the graphics image based on the larger luminance information.

According to a sixth aspect of the technique disclosed in the present specification, in the image processing apparatus according to the fifth aspect, the processor adjusts the luminance of the graphics image based on the reference luminance of the dynamic range of the predetermined luminance when the metadata acquiring unit is unable to acquire the Diffuse White luminance of the image data.

According to a seventh aspect of the technique disclosed in the present specification, the image processing apparatus according to any one of the first to sixth aspects further includes: a combiner that combines the graphics image processed by the processor with image data.

According to an eighth aspect of the technique disclosed in the present specification, the image processing apparatus according to the seventh aspect further includes: a dynamic range converter that adjusts a dynamic range of the luminance of the image data combined with the graphics image so as to match a display that displays the image data.

According to a ninth aspect of the technique disclosed in the present specification, in the image processing apparatus according to the eighth aspect, the metadata acquiring unit acquires at least one of information on a Diffuse White luminance indicating a luminance value of white serving as a reference of the image data or information on a target luminance indicating a luminance value of a main or target object of the image data (for each scene) as metadata, and the dynamic range converter adjusts the dynamic range of the luminance of the image data so as to maintain the Diffuse White luminance or the target luminance.

According to a tenth aspect of the technique disclosed in the present specification, in the image processing apparatus according to the eighth aspect, the metadata acquiring unit acquires information on the peak luminance of the image data as the metadata, and the dynamic range converter compresses the peak luminance of the image data up to a peak luminance of the display when the peak luminance of the image data is larger than the peak luminance of the display.

According to an eleventh aspect of the technique disclosed in the present specification, in the image processing apparatus according to the eighth aspect, the metadata acquiring unit acquires information on the peak luminance of the image data and information on the Diffuse White luminance indicating the luminance value of white serving as the reference of the image data as the metadata, and when the peak luminance of the image data is larger than the peak luminance of the display, the dynamic range converter compresses the peak luminance of the image data up to the peak luminance of the display and compresses a luminance between the peak luminance and the Diffuse White luminance while maintaining the luminance equal to or lower than the Diffuse White luminance.

According to a twelfth aspect of the technique disclosed in the present specification, in the image processing apparatus according to the eighth aspect, the metadata acquiring unit acquires information on a peak luminance of the image data and information on a target luminance indicating a luminance value of a main or target object of the image data as metadata, and when the peak luminance of the image data is larger than the peak luminance of the display, the dynamic range converter compresses the peak luminance of the image data up to the peak luminance of the display and compresses a luminance between the peak luminance and the target luminance while maintaining the luminance equal to or lower than the target luminance.

According to a thirteenth aspect of the technique disclosed in the present specification, in the image processing apparatus according to the eighth aspect, the metadata acquiring unit acquires information on a peak luminance of the image data, information on a Diffuse White luminance indicating a luminance value of white serving as a reference of the image data, and information on a target luminance indicating a luminance value of a main or target object of the image data as metadata, and when the Diffuse White luminance is larger than the peak luminance of the display, the dynamic range converter compresses the peak luminance of the image data up to the peak luminance of the display and compresses a luminance between the peak luminance and the target luminance while maintaining the luminance equal to or lower than the peak luminance.

Further, a technique according to a fourteenth aspect of the technique disclosed in the present specification is an image processing method including steps of: acquiring metadata of image data; and processing a graphics image to be superimposed on the image data based on the metadata.

Effects of the Invention

According to the techniques disclosed in the present specification, it is possible to provide an excellent image processing apparatus and method capable of displaying images by suitably superimposing a standard-dynamic-range graphics image on a high-dynamic-range image in an easily visible manner.

The advantages described in the present specification are examples only and the advantages of the present invention are not limited thereto. The present invention may provide additional advantages in addition to the above-described advantages.

Other objects, features, and advantages of the techniques disclosed herein will be apparent from more detailed description based on embodiments and accompanying drawings provided below.

BRIEF DESCRIPTION OF DRAWINGS

FIG. 6 is a diagram illustrating luminance information serving as references of display mapping on the EOTF characteristics.

FIG. 7 is a diagram illustrating a syntax example of dynamic range conversion definition information "knee_function_info SEI".

FIG. 8 is a diagram illustrating a parameter setting example illustrated in Table 2 as dynamic range conversion definition information.

MODE FOR CARRYING OUT THE INVENTION

Embodiments of the techniques disclosed in the present specification will be described in detail below with reference to the drawings.

Figure 1:
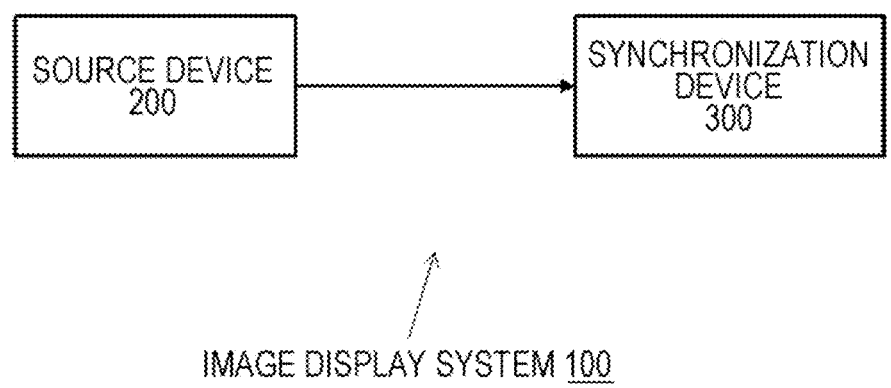
FIG. 1 is a diagram schematically illustrating a configuration example of an image display system 100 to which the techniques disclosed in the present specification are applied.

FIG. 1 schematically illustrates a configuration example of an image display system 100 to which the techniques disclosed in the present specification are applied. The image display system 100 includes a source device 200 that outputs HDR content and a synchronization device 300 that receives, displays, and outputs the HDR content.

When the image display system 100 is applied to a recording and reproducing system such as UHD-BD, the source device 200 is a media reproducing apparatus such as a BD player and the synchronization device 300 is a display or the like that displays and outputs a reproduced image. In the image display system 100, commercial content such as movies are transmitted from the source device 200 to the synchronization device 300. In a reproducing system like UHD-BD, a non-compressed reproduction stream is transmitted via a High Definition Multimedia Interface (HDMI: registered trademark), for example.

When the image display system 100 is applied to a webcasting system such as OTT, the source device 200 is a streaming server and the synchronization device 300 is a client configured as a personal computer or the like. Moreover, when the image display system 100 is applied to a digital broadcasting service, the source device 200 is a broadcasting station and the synchronization device 300 is a television receiver installed in houses. Moreover, content is transmitted as an encoded stream such as MPEG2 TS.

Figure 2:
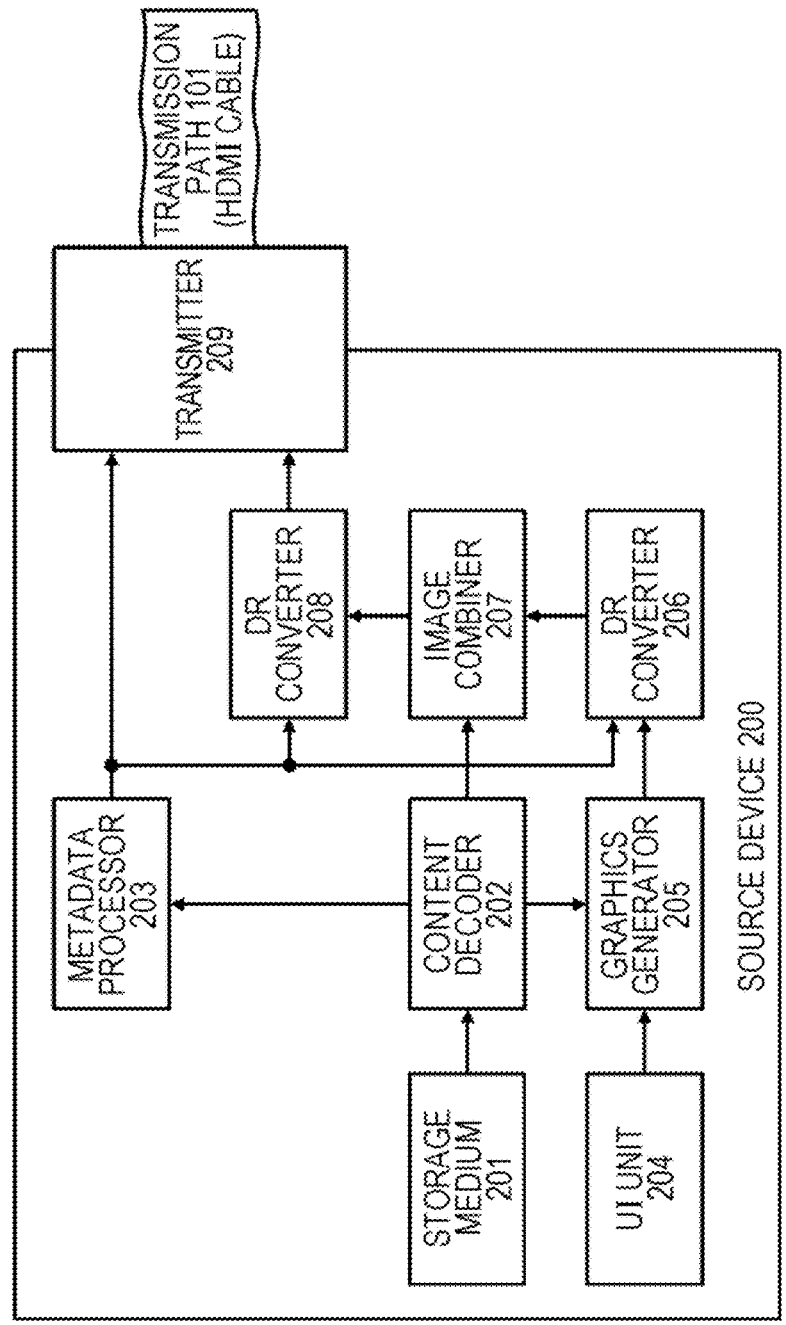
FIG. 2 is a diagram schematically illustrating a functional configuration example of a source device 200 that forms the image display system 100.

FIG. 2 schematically illustrates a functional configuration example of a source device 200 that forms the image display system 100. It is assumed that the source device 200 is HDR-compatible and is configured to be able to realize the techniques disclosed in the present specification.

The source device 200 includes a storage medium 201, a content decoder 202, a metadata processor 203, a user interface (UI) unit 204, a graphic generator 205, a dynamic range (DR) converter 206, an image combiner 207, a dynamic range (DR) converter 208, and a transmitter 209.

The storage medium 201 stores encoded compressed image data of commercial content such as movies. The content decoder 202 is configured as a MPEG decoder or the like and is configured to read encoded data from the storage medium 201, decode the encoded data, and reproduce content and metadata associated with the content.

In the present embodiment, it is assumed that the content decoder 202 decodes HDR content from the high-density recording medium 201 such as a Blu-ray Disc. Moreover, it is assumed that the metadata processor 203 processes luminance information (described later) useful for display mapping of HDR content, included as the metadata associated with the content.

The UI unit 204 processes an input from users. The graphics generator 205 generates a graphics image such as menus, OSD, or subtitles according to the data decoded by the content decoder 202 and the user's input or the like obtained via the UI unit 204. In the present embodiment, it is assumed that the graphics generator 205 generates a SDR graphics image temporarily.

The DR converter 206 converts the SDR graphics image generated by the graphics generator 205 to an HDR graphics image based on the luminance information output from the metadata processor 203 so that the dynamic range of the SDR graphics image matches HDR content. The details of the dynamic range conversion process of converting the SDR graphics image to the HDR graphics image based on metadata will be described later.

The image combiner 207 combines the HDR graphics image of which the dynamic range has been converted to HDR with the HDR content decoded by the content decoder 202.

The DR converter 208 performs dynamic range conversion on the HDR content combined with the HDR graphics image. The dynamic range conversion performed by the DR converter 208 aims to match the dynamic range that the synchronization device 300 connected via a transmission path 101 such as an HDMI (registered trademark) cable is compatible with. For example, when an HDR-incompatible synchronization device is connected, the dynamic range converter 208 converts the dynamic range of HDR content to SDR. However, when an HDR-compatible synchronization device is connected, the dynamic range converter 208 does not perform dynamic range conversion. For example, HDR compatibility of the synchronization device 300 may be determined via the transmission path 101 such as an HDMI (registered trademark) cable and the process performed by the dynamic range converter 208 may be switched adaptively.

The transmitter 209 is equipped with an HDMI (registered trademark) interface, for example, and is configured to multiplex the content output from the DR converter 208 and the metadata that the content decoder 202 has decoded from the recording medium 201 and transmit the multiplexed data to the synchronization device 300 via the transmission path 101 such as an HDMI (registered trademark) cable. A portion of the metadata may be generated by the metadata processor 203 in the source device 200. However, it cannot be said that a graphics image is always combined with the content transmitted to the synchronization device 300. Moreover, it cannot be said that metadata is associated with the content transmitted to the synchronization device 300. It is assumed that, when compressed content is transmitted to the synchronization device 300, the encoded data content read from the storage medium 201 is transmitted from the transmitter 209 without being decoded by the content decoder 202 or being compressed again by an encoder (not illustrated).

Figure 25:
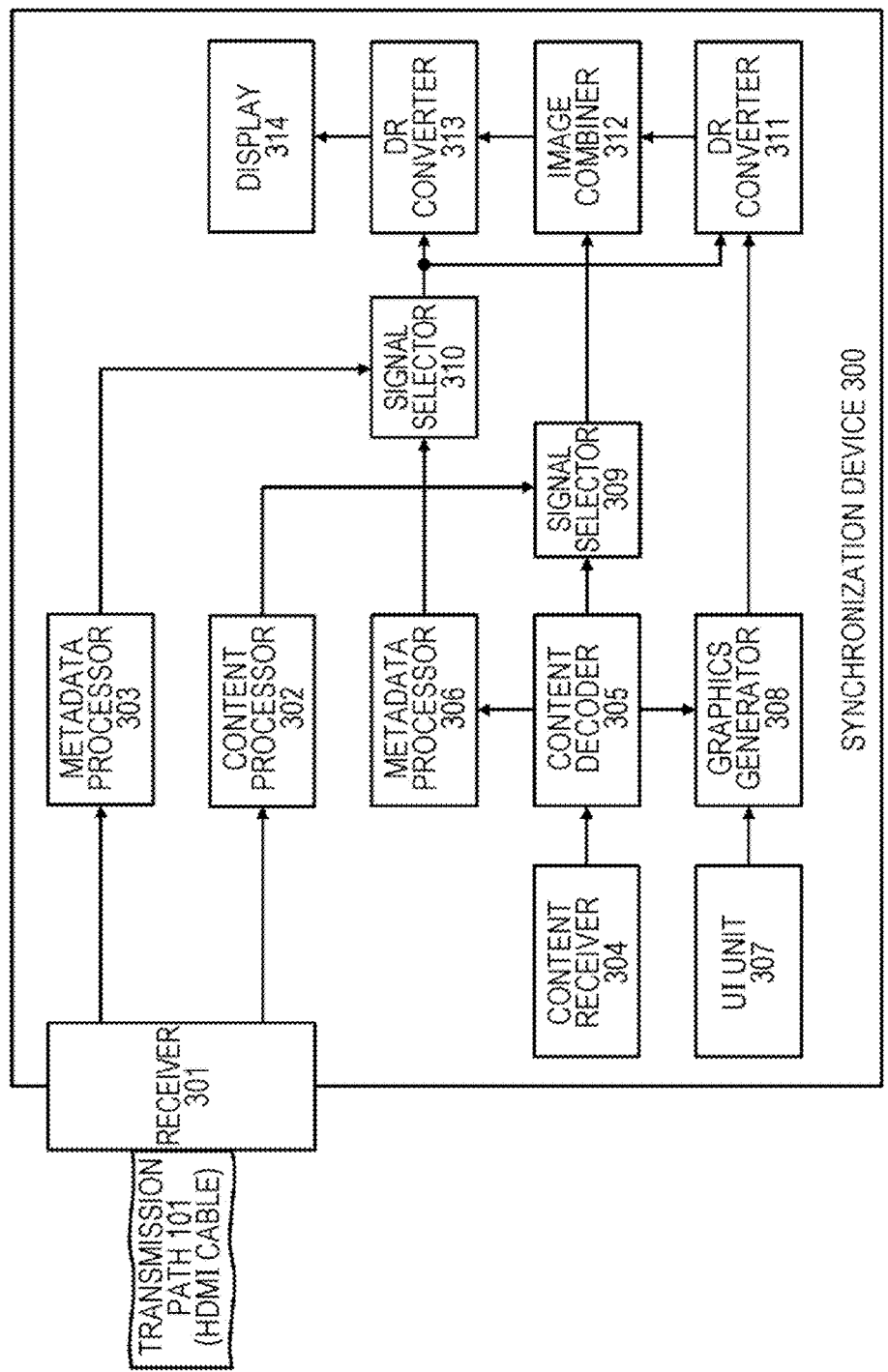
FIG. 25 is a diagram schematically illustrating a functional configuration example (HDR-compatible) of a synchronization device 300 that forms an image display system 100.

FIG. 25 schematically illustrates a functional configuration example of a synchronization device 300 that forms the image display system 100. It is assumed that the synchronization device 300 is HDR-compatible and is configured to be able to realize the techniques disclosed in the present specification.

The synchronization device 300 includes a receiver 301, a content processor 302, a metadata processor 303, a content receiver 304, a content decoder 305, a metadata processor 306, a UI unit 307, a graphics generator 308, a signal selector 309, a signal selector 310, a DR converter 311, an image combiner 312, a DR converter 313, and a display 314.

The receiver 301 is equipped with an HDMI (registered trademark) interface and is configured to receive a transmission signal from the source device 200 via a transmission path 101 such as an HDMI (registered trademark) cable and separate the transmission signal into content, metadata associated with the content, and a graphics image. It is assumed that, when compressed content is transmitted from the source device 200, the compressed content received by the receiver 301 is decoded by a decoder (not illustrated, for example, a MPEG decoder), separated into content and metadata, and then used in the subsequent processes. In the present embodiment, it is assumed that the content received from the source device 200 is an HDR image. The content processor 302 and the metadata processor 303 process the content and metadata received by the receiver 301, respectively. Moreover, the metadata processor 303 processes luminance information (described later) useful for display mapping of HDR content, included as the metadata associated with the content.

The content receiver 304 is configured as a digital broadcast tuner, for example, and is configured to tune to and receive a broadcast stream encoded in a predetermined encoding format such as MPEG. Alternatively, the content receiver 304 is configured as a network interface connected to a home network or an Internet Protocol (IP) network such as the Internet and is configured to receive an IP distribution stream encoded in a predetermined encoding format such as MPEG.

The content decoder 305 is configured as a MPEG decoder and is configured to decode an encoded stream received by the content receiver 304 and reproduce content and metadata associated with the content.

In the present embodiment, it is assumed that the content decoder 305 decodes HDR content from the stream received by the content receiver 304. Moreover, it is assumed that the metadata processor 306 processes luminance information (described later) useful for display mapping of HDR content, included as the metadata associated with the content.

The UI unit 307 processes an input from users. The graphics generator 308 generates a graphics image such as menus, OSD, or subtitles according to the user's input or the like obtained via the UI unit 307. In the present embodiment, it is assumed that the graphics generator 308 generates a SDR graphics image temporarily.

The signal selector 309 performs switching to select whether the HDR content received by the receiver 301 from the source device 200 or the HDR content received by the content receiver 304 will be displayed and output. That is, the signal selector 309 selects and outputs the signal from the content processor 302 when the content reproduced by the synchronization device 200 is displayed and selects and outputs the signal from the content decoder 305 when the content received by the content receiver 304 is displayed.

Moreover, the signal selector 310 switches signals in synchronization with the switching operation of the signal selector 309. That is, the signal selector 310 selects and outputs the metadata from the metadata processor 303 when the signal selector 309 selects and outputs the HDR content from the content processor 302. The signal selector 310 selects and outputs the metadata from the metadata processor 306 when the signal selector 309 selects and outputs the content received by the content receiver 304.

The DR converter 311 converts the SDR graphics image generated by the graphics generator 308 to an HDR graphics image based on the metadata information output from the signal selector 310 so that the dynamic range of the SDR graphics image matches the HDR content output from the signal selector 309. The details of the dynamic range conversion process of converting the SDR graphics image to the HDR graphics image will be described later.

The image combiner 312 combines the HDR graphics image of which the dynamic range has been converted to HDR with the HDR content output from the signal selector 309.

The dynamic range (DR) converter 313 converts the dynamic range of the HDR content combined with the graphics image. The dynamic range conversion process performed herein aims to match the performance (peak luminance or the like) of the display 314 (that is, aims to realize display mapping) and is performed based on the metadata information output from the signal selector 310. The details of the display mapping of content based on metadata are disclosed in the specification of Japanese Patent Application No. 2014-153320 assigned to the present applicant, for example.

The display 314 displays and outputs the combined image on which display mapping has been performed by the dynamic range (DR) converter 313 on a display panel (not illustrated).

Figure 26:
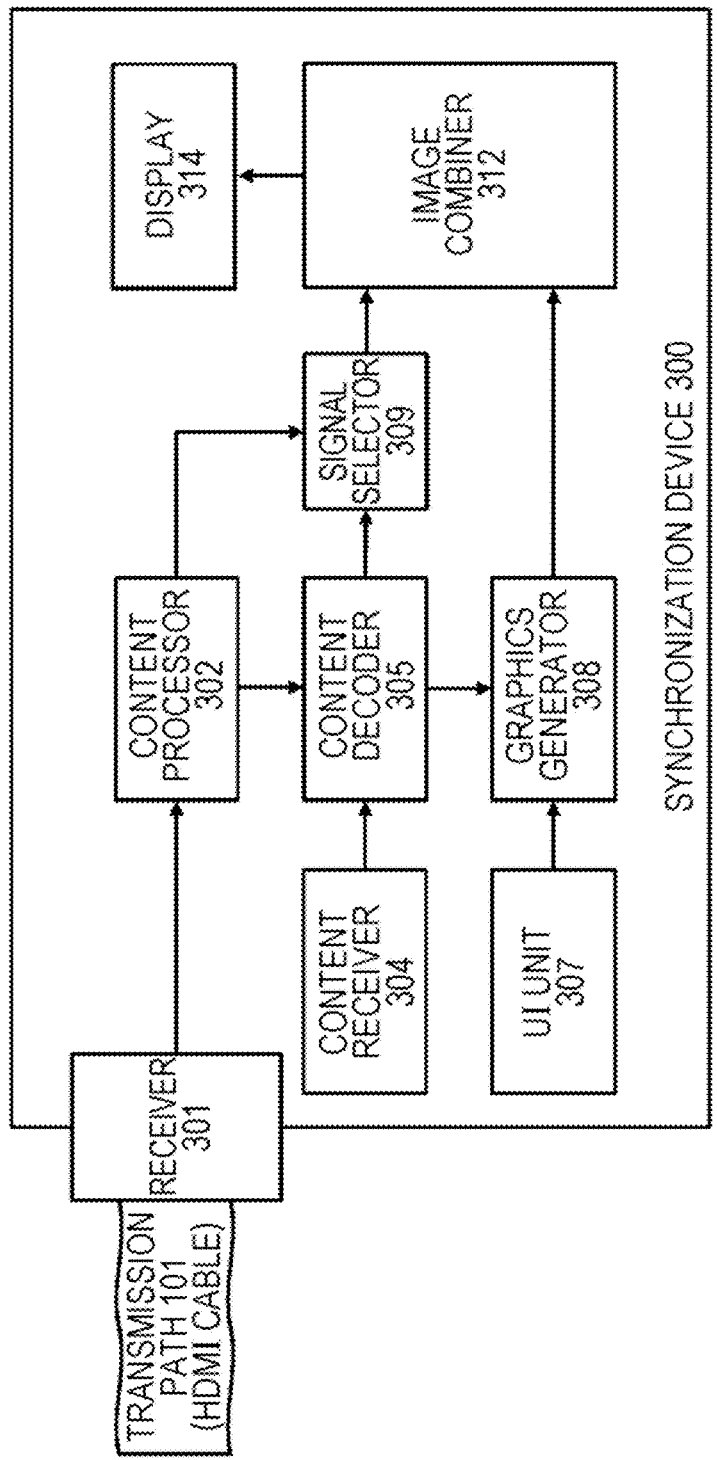
FIG. 26 is a diagram schematically illustrating another functional configuration example (HDR-incompatible) of a synchronization device 300 that forms an image display system 100.

FIG. 26 schematically illustrates another functional configuration example of the synchronization device 300 that forms the image display system 100. It is assumed that the synchronization device 300 is HDR-incompatible and is configured to be unable to realize the techniques disclosed in the present specification.

The synchronization device 300 includes a receiver 301, a content processor 302, a content receiver 304, a content decoder 305, a UI unit 307, a graphics generator 308, a signal selector 309, an image combiner 312, and a display 314.

The receiver 301 is equipped with an HDMI (registered trademark) interface and is configured to receive a transmission signal from the source device 200 via a transmission path 101 such as an HDMI (registered trademark) cable. It is assumed that, when compressed content is transmitted from the source device 200, the compressed content received by the receiver 301 is decoded by a decoder (not illustrated, for example, a MPEG decoder) and is used in the subsequent processes. In the example illustrated in FIG. 26, it is assumed that the content received from the source device 200 is a SDR image. The content processor 302 processes the content received by the receiver 301.

The content receiver 304 is configured as a digital broadcast tuner, for example, and is configured to tune to and receive a broadcast stream encoded in a predetermined encoding format such as MPEG. Alternatively, the content receiver 304 is configured as a network interface connected to a home network or an Internet Protocol (IP) network such as the Internet and is configured to receive an IP distribution stream encoded in a predetermined encoding format such as MPEG.

The content decoder 305 is configured as a MPEG decoder and is configured to decode an encoded stream received by the content receiver 304 and reproduce content and metadata associated with the content. In the example illustrated in FIG. 26, it is assumed that the content decoder 305 decodes SDR content from the stream received by the content receiver 304.

The UI unit 307 processes an input from users. The graphics generator 308 generates a graphics image such as menus, OSD, or subtitles according to the user's input or the like obtained via the UI unit 307. Here, it is assumed that the graphics generator 308 generates a SDR graphics image.

The signal selector 309 performs switching to select whether the HDR content received by the receiver 301 from the source device 200 or the content received by the content receiver 304 will be displayed and output. That is, the signal selector 309 selects and outputs the signal from the content processor 302 when the content reproduced by the synchronization device 200 is displayed and selects and outputs the signal from the content decoder 305 when the content received by the content receiver 304 is displayed.

The image combiner 312 combines the SDR graphics image generated by the graphics generator 308 with the SDR content selected and output by the signal selector 309. The display 314 displays and outputs the combined image on a display panel (not illustrated).

Figure 3:
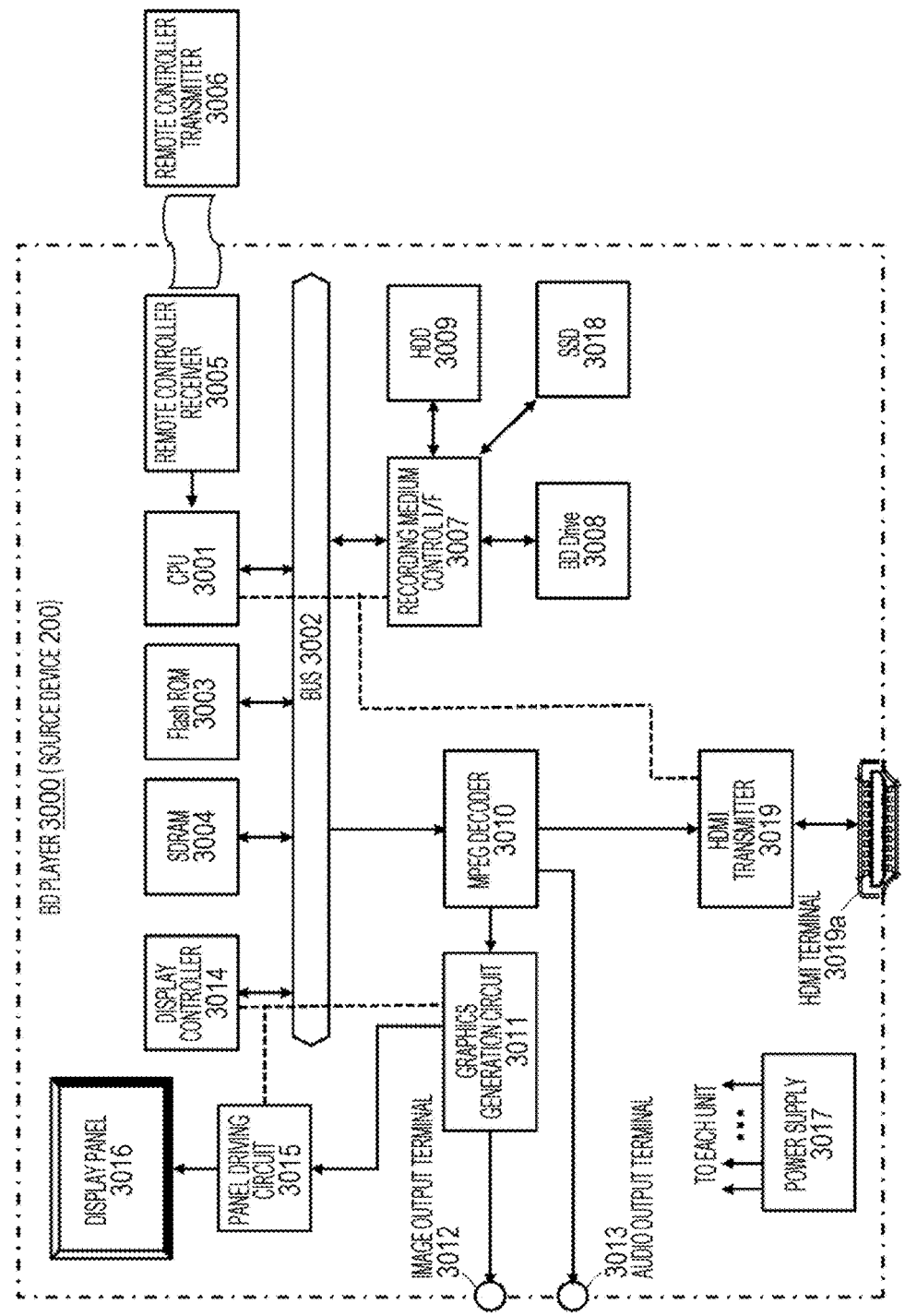
FIG. 3 is a diagram illustrating a hardware configuration of a BD player 3000 as an example of the source device 200.

FIG. 3 illustrates a hardware configuration of a BD player 3000 as an example of the source device 200 illustrated in FIG. 2.

The BD player 3000 includes a central processing unit (CPU) 3001, an internal bus 3002, flash read only memory (ROM) 3003, synchronous random access memory (SDRAM) 3004, a remote controller receiver 3005, and a remote controller transmitter 3006.

Moreover, the BD player 3000 includes a storage medium control interface 3007 and at least one recording medium of a Blu-ray (registered trademark) Disc (BD) drive 3008, a hard disk drive (HDD) 3009, and a solid state disc (SSD) 3018. When the BD drive 3008 or the HDD 3009 is equipped as a recording medium, a serial advanced technology attachment (SATA) interface is provided as the recording medium control interface 3007. Moreover, when the SSD 3018 is equipped as a recording medium, a peripheral component interconnect (PCI) express may be used as the recording medium interface 3007.

Moreover, the BD player 3000 includes a moving picture expert group (MPEG) decoder 3010, a graphic generation circuit 3011, an image output terminal 3012, and an audio output terminal 3013.

Moreover, the BD player 3000 may include a display controller 3014, a panel driving circuit 3015, a display panel 3016, and a power supply 3017. The CPU 3001, the flash ROM 3003, the SDRAM 3004, the remote controller receiver 3005, the storage medium control interface 3007, and the MPEG decoder 3010 are connected to the internal bus 3002. The HDM transmitter 3019 is connected to an HDMI (registered trademark) terminal 3019a.

The CPU 3001 controls the operation of respective units of the BD player 3000. The flash ROM 3003 stores controls software and data. The SDRAM 3004 forms a work area of the CPU 3001. The CPU 3001 imports the software and data read from the flash ROM 3003 onto the SDRAM 3004 to activate the software and controls the respective units of the BD player.

The remote controller receiver 3005 receives a remote control signal (remote control code) transmitted from the remote controller transmitter 3006 and supplies the remote control code to the CPU 3001. The CPU 3001 controls the respective units of the BD player according to the remote control code. In the illustrated example, although the BD player 3000 illustrates the remote controller transmitter 3006 as a user instruction input unit, the user instruction input unit of the BD player 3000 may be the other configuration such as a touch panel unit that receives instructions with the aid of a switch, a wheel, an approach, and a touch, a gesture input unit that detects the input of instructions with the aid of a mouse, a keyboard, and a camera, or a voice input unit that receives instructions with voice (these input units are not illustrated).

The BD drive 3008 records content data on a BD disc (not illustrated) as a disc-shaped recording medium or reproduced content data from the BD disc. The BD drive 3008 is connected to the internal bus 3002 via the recording medium control interface 3007. Moreover, the HDD drive 3009 records content data on a HDD or reproduces content data from the HDD. The HDD drive 3009 is connected to the internal bus 3002 via the recording medium control interface 3007. Moreover, the SSD 3018 records content data or reproduces content data from the SSD 3018. The SSD 3018 is connected to the internal bus 3002 via the recording medium control interface 3007. The MPEG decoder 3010 decodes a MPEG2 stream reproduced by the BD drive 3008, the HDD drive 3009, or the SSD 3018 to obtain image and audio data.

The graphic generation circuit 3011 performs a process of superimposing graphics data on the image data obtained by the MPEG decoder 3010 as necessary. The image output terminal 3012 outputs the image data output from the graphic generation circuit 3011. The audio output terminal 3013 outputs audio data obtained by the MPEG decoder 3010.

The panel driving circuit 3015 drives the display panel 3016 based on the image data output from the graphic generation circuit 3011. The display controller 3014 controls the graphics generation circuit 3011 and the panel driving circuit 3015 to control the display on the display panel 3016. The display panel 3016 is configured as a liquid crystal display (LCD), an organic electro-luminescence (EL) panel, or the like.

In FIG. 3, although a configuration example which includes the display controller 3014 in addition to the CPU 3001 is illustrated, the display on the display panel 3016 may be controlled directly by the CPU 3001. Moreover, the CPU 3001 and the display controller 3014 may be configured as one chip or a plurality of chips. The power supply 3017 supplies electric power to the respective units of the BD player 3000. The power supply 3017 may be an AC power supply and may be a battery (a storage battery or a dry battery).

The HDMI (registered trademark) transmitter 3019 transmits baseband image and audio data from the HDMI (registered trademark) terminal 3019a to the synchronization device 300 such as a television receiver according to communication based on HDMI (registered trademark).

The operation of the BD player 3000 illustrated in FIG. 3 will be described briefly. During recording, content data to be recorded is acquired via a digital tuner (not illustrated) or the HDMI (registered trademark) terminal 3019a. The content data is input to the recording medium control interface 3007 and is recorded on a BD medium by the BD drive 3008 or recorded on the HDD drive 3009 or the SSD 3018.

On the other hand, during reproduction, content data (MPEG stream) that is reproduced from a BD medium by the BD drive 3008 or reproduced from the HDD drive 3009 or the SSD 3018 is supplied to the MPEG decoder 3010 via the recording medium control interface 3007. The MPEG decoder 3010 decodes the reproduced content data to obtain baseband image and audio data. The image data is output to the outside from the image output terminal 3012 through the graphic generation circuit 3011. Moreover, the audio data is output to the outside from the audio output terminal 3013.

Further, during reproduction, the image data obtained by the MPEG decoder 3010 is supplied to the panel driving circuit 3015 through the graphic generation circuit 3011 and a reproduced image is displayed on the display panel 3016. Moreover, the audio data obtained by the MPEG decoder 3010 is supplied to a speaker (not illustrated) according to a user's operation and audio corresponding to the reproduced image is output.

Further, during reproduction, when the image and audio data obtained by the MPEG decoder 3010 is transmitted by an HDMI (registered trademark) TMDS channel, these items of image and audio data are supplied to the HDMI (registered trademark) transmitter 3019 together with the graphics image generated by the graphic generation circuit 3011, and the image and audio data and the graphics image are packed together and supplied from the HDMI (registered trademark) transmitter 3019 to the HDMI (registered trademark) terminal 3019a.

In the present specification, the BD player 3000 has been illustrated as an example of the source device 200 which can be used in the image display system 100 to which the techniques disclosed in the present specification can be applied. However, various other types of source devices that transmit image data other than the BD player may be used. Examples of such source devices include a disc recorder, a disc player, a set top box (STB), a game machine, a network attached storage (NAS), and a digital video camera. The details of the process of combining a SDR graphics image with HDR content in the HDR-compatible source device 200 such as a BD player will be described later.

Figure 4:
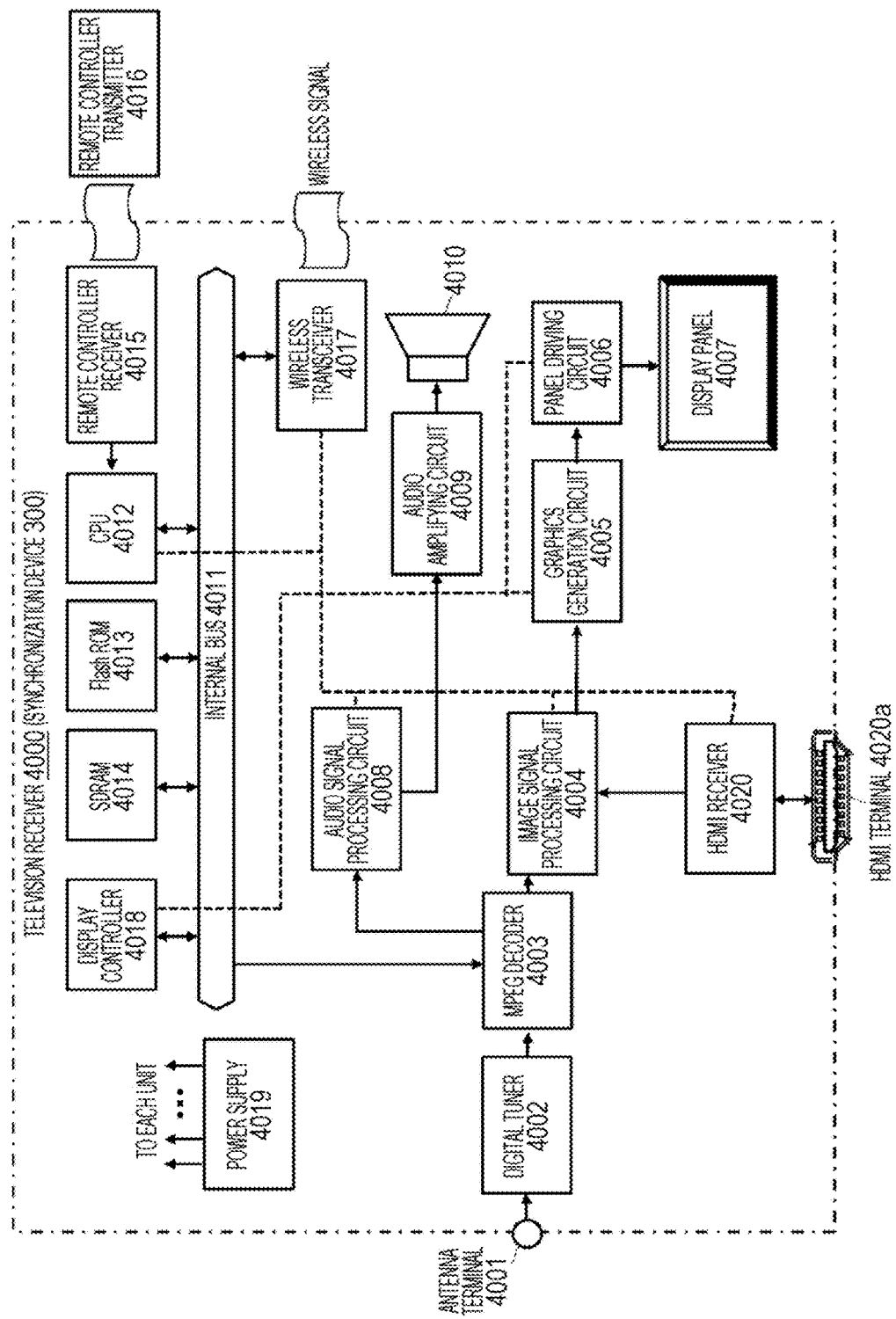
FIG. 4 is a diagram illustrating a hardware configuration of a television receiver 4000 as an example of a synchronization device 300.

FIG. 4 illustrates a hardware configuration of a television receiver 4000 as an example of the synchronization device 300 illustrated in FIG. 25 or 26.

The television receiver 4000 includes an antenna terminal 4001, a digital tuner 4002, a MPEG decoder 4003, an image signal processing circuit 4004, a graphic generation circuit 4005, a panel driving circuit 4006, and a display panel 4007.

Moreover, the television receiver 4000 includes an audio signal processing circuit 4008, an audio amplifying circuit 4009, a speaker 4010, an internal bus 4011, a CPU 4012, flash ROM 4013, and SDRAM 4014. Moreover, the television receiver includes a wireless transceiver 4017, a remote controller receiver 4015, and a remote controller transmitter 4016. Further, the television receiver 4000 includes a display controller 4018 and a power supply 4019.

The antenna terminal 4001 is a terminal that receives a television broadcast signal received by a receiver antenna (not illustrated). The digital tuner 4002 processes the television broadcast signal input to the antenna terminal 4001 to extract a partial transport stream (TS) (a TS packet of image data and a TS packet of audio data) from a predetermined transport stream corresponding to a channel selected by a user.

Moreover, the digital tuner 4002 extracts program specific information/service information (PSI/SI) from the obtained transport stream and outputs the PSI and SI to the CPU 4012. The process of extracting a partial TS of an optional channel from a plurality of transport streams obtained by the digital tuner 4002 is realized by obtaining packet ID (PID) information of the optional channel from the PSI/SI (PAT/PMT).

The MPEG decoder 4003 decodes an image PES (packetized elementary stream) packet that is made up of the TS packets of the image data obtained by the digital tuner 4002 to obtain image data. Moreover, the MPEG decoder 4003 decodes an audio PES packet that is made up of the TS packets of the audio data obtained by the digital tuner 4002 to obtain audio data.

The image signal processing circuit 4004 and the graphic generation circuit 4005 perform a scaling process (resolution conversion process), a dynamic range adjustment process, a graphics data superimposing process, and other processes as necessary on the image data obtained by the MPEG decoder 4003 or the image data received by an HDMI (registered trademark) receiver 4020. It is assumed that the dynamic range adjustment process is performed by converting a dynamic range based on the image data and metadata received from the HDMI (registered trademark) source device (BD player), the digital tuner 4002, or the wireless transceiver 4017 which is the transmitter of image data.

The panel driving circuit 4006 drives the display panel 4007 based on the image data output from the graphic generation circuit 4005. The display controller 4018 controls the graphics generation circuit 4005 and the panel driving circuit 4006 to control the display on the display panel 4007. The display panel 4007 is configured as an LCD, an organic EL panel, or the like.

In FIG. 4, although an example which includes the display controller 4018 in addition to the CPU 4012 is illustrated, the display on the display panel 4007 may be controlled directly by the CPU 4012. Moreover, the CPU 4012 and the display controller 4018 may be configured as one chip or a plurality of chips. The power supply 4019 supplies electric power to the respective units of the television receiver 4000. The power supply 4019 may be an AC power supply and may be a battery (a storage battery or a dry battery).

The audio signal processing circuit 4008 performs a necessary process such as D/A conversion on the audio data obtained by the MPEG decoder 4003. The audio amplifying circuit 4009 amplifies the audio signal output from the audio signal processing circuit 4008 and supplies the amplified audio signal to the speaker 4010. The speaker 4010 may be a mono speaker or may be a stereo speaker. Moreover, the speaker 4010 may be a single speaker and may include two or more speakers. Further, the speaker 4010 may be an earphone or a headphone. Further, the speaker 4010 may be a 2.1-channel speaker, a 5.1-channel speaker, or other speakers. Further, the speaker 4010 may wirelessly connect to the main body of the television receiver 4000. Further, the speaker 4010 may be a device that is externally connected to the television receiver 4000.

The CPU 4012 controls the operation of the respective units of the television receiver 4000. The flash ROM 4013 stores software and data. The SDRAM 4014 forms a work area of the CPU 4012. The CPU 4012 imports the software and data read from the flash ROM 4013 onto the SDRAM 4014 to activate the software and controls the respective units of the television receiver 4000.

The remote controller receiver 4015 receives a remote control signal (remote control code) transmitted from the remote controller transmitter 4016 and supplies the remote control code to the CPU 4012. The CPU 4012 controls the respective units of the television receiver 4000 according to the remote control code. In the example illustrated in FIG. 4, although the remote controller unit is illustrated as a user instruction input unit, the user instruction input unit of the television receiver 4000 may be the other configuration such as a touch panel unit that receives instructions with the aid of an approach and a touch, a gesture input unit that detects the input of instructions with the aid of a mouse, a keyboard, and a camera, or a voice input unit that receives instructions with voice (these input units are not illustrated).

The CPU 4012, the flash ROM 4013, the SDRAM 4014, the wireless transceiver 4017, the MPEG decoder 4003, and the display controller 4018 are connected to the internal bus 4011. Moreover, the HDMI (registered trademark) receiver 4020 is connected to the HDMI (registered trademark) terminal 4020*a*.

The HDMI (registered trademark) receiver 4020 receives non-compressed image and audio data supplied to the HDMI (registered trademark) terminal 4020*a* via an HDMI (registered trademark) cable according to communication based on HDMI (registered trademark).

The wireless transceiver 4017 performs wireless communication with the CPU 4012 and an external device via the internal bus 4002. The wireless transceiver 4017 performs wireless communication according to wireless communication standards such as Wi-Fi (registered trademark) (Wireless Fidelity), Bluetooth (registered trademark) communication, or BLE (Bluetooth (registered trademark) Low Energy) communication.

The television receiver 4000 may receive image and audio data distributed by an IPTV or the like. For example, the television receiver 4000 can realize the same functions even when an Ethernet (registered trademark) circuit and an Ethernet (registered trademark) terminal are included instead of the wireless transceiver 4017 (or together with the wireless transceiver 4017).

The operation of the television receiver 4000 illustrated in FIG. 4 will be described briefly. A television broadcast signal input to the antenna terminal 4001 is supplied to the digital tuner 4002. The digital tuner 4002 processes the television broadcast signal, extracts a partial TS (a TS packet of image data and a TS packet of audio data) from a predetermined transport stream corresponding to a channel selected by a user, and supplies the partial TS to the MPEG decoder 4003.

The MPEG decoder 4003 decodes an image PES packet that is made up of the TS packets of image data to obtain image data. The image data is subjected to a scaling process (resolution conversion process), a dynamic range adjustment process, a graphics data superimposing process, and the like as necessary by the image signal processing circuit 4004 and the graphic generation circuit 4005, and the processed image data is supplied to the panel driving circuit 4006. Thus, an image corresponding to the channel selected by the user is displayed on the display panel 4007.

Moreover, the MPEG decoder 4003 decodes an audio PES packet that is made up of the TS packets of audio data to obtain audio data. The audio data is subjected to a necessary process such as D/A conversion by the audio signal processing circuit 4008 and the processed audio data is amplified by the audio amplifying circuit 4009 and is then supplied to the speaker 4010. Thus, audio corresponding to the channel selected by the user is output from the speaker 4010.

Moreover, the HDMI (registered trademark) receiver 4020 acquires non-compressed image and audio data that is transmitted from the source device 200 such as a BD player connected to the HDMI (registered trademark) terminal 4020*a* via an HDMI (registered trademark) cable. In the present embodiment, it is assumed that metadata (described later) is associated with the image data transmitted to the HDMI (registered trademark) receiver 4020. The received image data is supplied to the image signal processing circuit 4004. Moreover, the received audio data is supplied directly to the audio signal processing circuit 4008. After that, the same operation as that during reception of a television broadcast signal is performed. That is, an image is displayed on the display panel 4007 and audio is output from the speaker 4010. The details of the process of combining a SDR graphics image with HDR content in the HDR-compatible synchronization device 300 such as the television receiver will be described later.

When an HDR technique is applied to the image display system 100, a case in which the dynamic range of an image transmitted from the source device 200 does not match the dynamic range of an image that can be displayed on the display 314 of the synchronization device 300 may occur. In such a case, the synchronization device 300 needs to perform display mapping which involves converting the dynamic range of the received image so as to match the performance of the synchronization device 300.

However, in display mapping, if the dynamic range is converted just by linear scaling, a large amount of information may be lost, and for example, the appearance of a person may be greatly different from a source image to a result image. Such a loss of information is contrary to the intention of a content producer or supplier.

The present inventors have found that, in order to realize HDR in the image display system 100, it is necessary for a producer or the source device 200 to provide HDR content and for the synchronization device 300 to be equipped with an HDR-compatible display device and to establish an HDR content production workflow.

Moreover, it is necessary to reflect the intention of content producers or suppliers when the synchronization device 300 converts the dynamic range of HDR image according to display mapping.

Therefore, in the techniques disclosed in the present specification, the synchronization device 300 transmits metadata associated with an image stream as well as content rather than performing just linear scaling in order to realize dynamic range conversion according to the intention of content producers and suppliers.

In a series of workflow including HDR content production, imaging, editing, encoding and decoding, transmission, and display, metadata for storing information indicating the intention of a content producer or supplier, such as a peak luminance, a color gamut, or an electro-optical transfer function (EOTF) of content during mastering or grading is defined. Such metadata is recorded on a medium such as a BD in association with content. In the image display system 100, when reproduction content is transmitted from the source device 200 to the synchronization device 300, such metadata is transmitted together with the content. Moreover, the synchronization device 300 can display an HDR image effectively which reflects the intention of a content producer or supplier by performing a process such as dynamic range conversion on the reproduction content using the metadata.

Metadata for reflecting the intention of a content producer or supplier can be broadly classified into the following two types (1) and (2).

(1) Metadata that can be acquired during authoring or mastering of content (2) Metadata that is useful (or strongly required) for display mapping The following elements (a) to (d) can be thought as examples of the latter metadata useful for display mapping.

(a) Peak luminance of a monitor display used for mastering of content (b) Peak luminance of content (c) Diffuse White luminance (d) Target luminance Here, the mastering monitor peak luminance (a) can be automatically detected as a basic specification of hardware. Moreover, the content peak luminance (b) is the maximum luminance in an image or scene, and for example, corresponds to a portion from which light reflects and can be automatically detected by analyzing the luminance of an image. Further, the Difuse White luminance (c) is the luminance of white serving as a reference in an image or scene. The Difuse White luminance is the luminance of white that occupies a large area and can be automatically detected by analyzing the luminance of an image and a content producer can arbitrarily change the detection value. Further, the target luminance (d) is the luminance of a main object of a scene, that a content producer wants to show mainly and is set by the content producer. For example, in a scene in which a person is captured, the target luminance is the luminance corresponding to the skin (flesh tone) of the person. Among the four types of luminance information, (a) is a static value defined by the specification of hardware and (b) to (d) are dynamic values that change from scene to scene.

Figure 5:
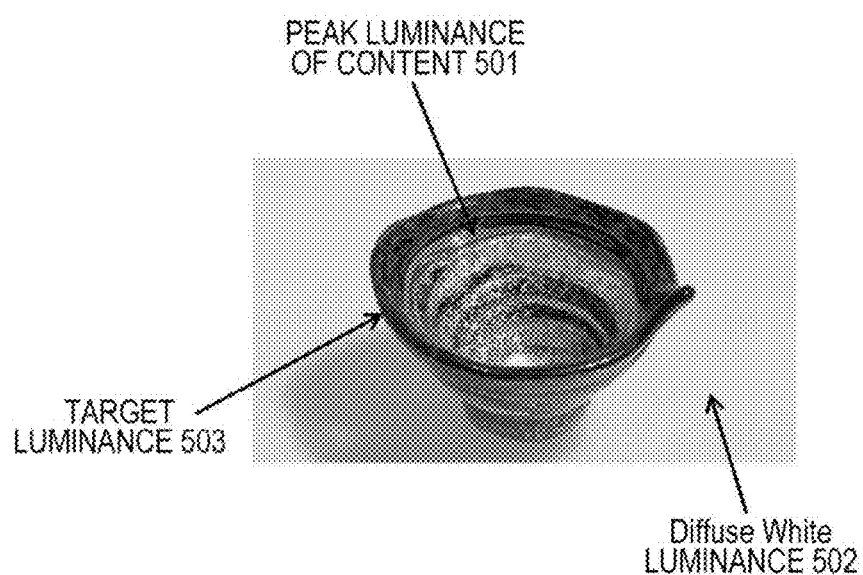
FIG. 5 is a diagram illustrating respective items of luminance information serving as references of display mapping using a captured image as an example.

The respective items of luminance information (b) to (d) serving as references of display mapping will be described using an image of a glass-work placed on a white table illustrated in FIG. 5 as an example. A portion from which light reflects on the surface of the glass-work corresponds to a peak luminance 501, and the white table occupies a large area of the scene and corresponds to a Diffuse White luminance 502. Moreover, the glass-work is a main object of the scene illustrated in FIG. 4, and the content producer sets a portion of the surface that the content producer wants to show mainly as a target luminance 503.

It is considered that, when display mapping is performed on HDR content, the content producer or supplier strongly wants to maintain luminance values equal to or lower than the target luminance. Moreover, it is considered that the content producer or supplier wants to maintain luminance values between the target luminance and the Diffuse White luminance to some extent.

FIG. 6 illustrates examples of luminance information (b) to (d) serving as references of display mapping on EOTF characteristics (the horizontal axis represents luminance (in 10-bit code values) and the vertical axis represents a linear luminance value [cd/m$^2$]).

In FIG. 6, reference numeral 601 indicates a content peak luminance (Peak White). In the illustrated example, the peak luminance is 2000 cd/m$^2$ and is 844 in 10-bit code values.

Moreover, reference numeral 602 indicates a Diffuse White luminance. A reference white luminance value is set to the Diffuse White luminance. Specifically, the Diffuse White luminance corresponds to dominant white or the like such as a table or a shirt captured in a scene and is a luminance of approximately 300 to 500 cd/m$^2$, which corresponds to 100% white of conventional SDR. In the illustrated example, the Diffuse White luminance is set to 500 cd/m$^2$ and is 691 in 10-bit code values.

Moreover, reference numeral 603 indicates a target luminance. A luminance value of the skin color (flesh tone) of a main person of a scene or a main object of the scene is set to the target luminance. In the illustrated example, the target luminance is set to 50 cd/m$^2$ and is 451 in 10-bit code values.

In the image display system 100 according to the present embodiment, in order to realize display mapping appropriately, the luminance information (a) to (d) is included in the metadata associated with content. That is, the metadata associated with HDR content designates a Diffuse White luminance or a target luminance which is a luminance point to be maintained. The synchronization device 300 can display images according to the intention of a content producer or supplier by referring to the luminance information (a) to (d) designated by the metadata when compressing or extending the dynamic range during display mapping.

The metadata needs to be dynamic in order to reflect the luminance (a) to (d) in respective scenes.

Supplemental enhancement information (SEI) that has been defined by MPEG, for example, can be used as a container for transmitting the luminance information (a) to (d) useful for display mapping. Alternatively, new SEI serving as a container for transmission of the luminance information (a) to (d) may be defined and an existing transmission container other than SEI may be used.

A method for transmitting metadata useful for display mapping will be described for a case in which "knee_function_info SEI (supplemental enhancement information)" defined as dynamic range conversion definition information for non-compressed image data in MPEG is used as the transmission container for the luminance information (a) to (d).

FIG. 7 illustrates a syntax example of the dynamic range conversion definition information "knee_function_info SEI". First, original meanings of respective parameters will be described.

In knee_function_info 700, a knee conversion ID (knee_function_id) 701 and a knee conversion cancel flag (knee_function_cancel_flag) 702 are set.

The knee conversion ID 701 is a unique ID indicating the purpose of knee conversion, which is knee compression or knee extension. In the present embodiment, it is assumed that the knee conversion ID 701 is set to Low level "0" when the knee_function_info SEI is used as the original dynamic range conversion definition information, whereas the knee conversion ID 701 is set to High level "1" when the knee_function_info SEI is used as the transmission container for the luminance information (a) to (d). Moreover, the knee conversion cancel flag 702 is a flag indicating whether the continuity of the previous knee_function_info will be canceled or not. The knee conversion cancel flag 702 is set to High level "1" when the continuity of the previous knee_function_info is canceled and is set to Low level "0" when the continuity is not canceled.

Moreover, when the knee conversion cancel flag 702 is Low level "0," the dynamic range conversion definition information is set to the knee_function_info 700. The dynamic range conversion definition information includes a persistence flag (knee_function_persistence_flag) 703, a compression/extension flag (mapping_flag) 704, input image dynamic range information (input_d_range) 705 for storing the peak luminance (in 0.1% units) of an input image, input image display maximum luminance information (input_disp_luminance) 706 for storing the brightness (in 0.1% units) of a display corresponding the peak luminance of an input image, an output image dynamic range information (output_d_range) 707 for storing the peak luminance (in 0.1% units) of an output image, an output image display maximum luminance information (output_disp_luminace) 708 for storing the brightness (in 0.1% units) of a display corresponding to the peak luminance of an output image, and knee point number information (num_knee_point_minus1) 709. Further, a loop 710 for information for each of a number of knee points corresponding to the number of items of knee point number information 709 is disposed. In each knee point information loop, pre-conversion knee point information (input_knee_point) 711 and post-conversion knee point information (output_knee_point) 712 are set for each knee point.

The persistence flag 703 indicates whether the knee_function_info 700 transmitted once is still valid thereafter or is valid only once. When only a picture to which the knee_function_info 600 is appended is valid, the persistence flag 703 is set to Low level "0". When the knee_function_info 700 is valid until a stream changes or a new knee conversion ID 701 is transmitted, the persistence flag 703 is set to High level "1".

The compression/extension flag 704 is a flag indicating whether the knee conversion is knee compression or not. That is, when the number of knee points is 1 and the pre-conversion knee point information is equal to or larger than the post-conversion knee point information, it can be determined that the knee conversion is knee extension. When the pre-conversion knee point information is smaller than the post-conversion knee point information, it can be determined that the knee conversion is knee compression. However, when the number of knee points is plural, since it is not possible to determine accurately whether the knee conversion is knee extension or knee compression based on the magnitude relation between the pre-conversion knee point information and the post-conversion knee point information, the compression/extension flag 704 is set. The compression/extension flag 704 may be set even when the number of knee points is 1. The compression/extension flag 704 is set to High level "1" when the knee conversion is knee compression and is set to Low level "0" when the knee conversion is knee extension.

The knee point number information 709 is a value obtained by subtracting "1" from the number of knee points. The order "i" (i is an integer of 0 or larger) in which the pre-conversion knee point information 711 and the post-conversion knee point information 712 are set is based on the ascending order of pre-conversion knee point information 711. In a number of loops corresponding to the number of subsequent knee points, the pre-conversion knee point information 711 and the post-conversion knee point information 712 at the knee point "i" are stored.

The pre-conversion knee point information 711 is information indicating a knee point of a pre-conversion encoding target image in dynamic range conversion and is represented by permillage of the knee point when the maximum luminance of the encoding target image is 1000‰. The knee point is a luminance other than 0 which is a start point of a range of luminance values which are knee-converted at the same conversion ratio as that of the dynamic range of the luminance of the encoding target image.

Moreover, the post-conversion knee point information 712 is information indicating a start point of a range of luminance values corresponding to the range of knee-converted luminance values which has a knee point as a start point of a converted image in dynamic range conversion. Specifically, the post-conversion knee point information (output_knee_point) is represented by a permillage of the luminance of the converted image corresponding to a knee point when the maximum luminance of the converted image is 1000‰.

Here, when the knee_function_info SEI illustrated in FIG. 7 is used as a transmission container for the luminance information (a) to (d) useful for display mapping, the luminance value of a target luminance is stored as first pre-conversion knee point information and first post-conversion knee point information, the luminance value of a Diffuse White luminance is stored as second pre-conversion knee point information and first post-conversion knee point information, and a peak luminance value of content is stored as third pre-conversion knee point information and first post-conversion knee point information. The semantics of respective parameters when the knee_function_info SEI is used as a transmission container for luminance information are illustrated in Table 1.

TABLE 1

| HEV Metadata | Syntax | Semantics |
|---|---|---|
| Knee function information SEI | input_disp_luminance | Luminance value of normalization 1.0 |
| Knee function information SEI (1$^{st}$ knee point) | input_knee_point [0] output_knee_point [0] | Target luminance value |
| Knee function information SEI (2$^{nd}$ knee point) | input_knee_point [1] output_knee_point [1] | Diffuse White luminance |

Moreover, an example in which the luminance information (b) to (d) is set to the respective parameters of the knee_function_info SEI is illustrated in Table 2. FIG. 8 illustrates parameter setting examples 801, 802, and 803 illustrated in Table 2 as dynamic range conversion definition information.

TABLE 2

| Field name | Setting value example |
|---|---|
| input/output_d_range | 0 |
| input/output_disp_luminance | 10000 |
| num knee_points_minus1 | 2 |
| input/output knee point[0] | 5 |
| input/output knee point[1] | 50 |
| input/output knee point[2] | 200 |

Presumption
Content peak luminance = 2000 cd/m$^2$
Target luminance = 50 cd/m$^2$
Diffuse White luminance = 500 cd/m$^2$
EOTF = PQ As described above, in the image display system 100 according to the present embodiment, the luminance information (a) to (d) useful for display mapping is transmitted in a transmission container such as Knee function information SEI. Moreover, it is possible to display images according to the intention of a content producer or supplier by referring to the luminance information (a) to (d) designated by the metadata when compressing or extending the dynamic range during display mapping. Specifically, it is expected that a luminance equal to or lower than a target luminance is to be maintained rather than linearly scaling the dynamic range during compression and extension and that luminance values between the target luminance and the Diffuse White luminance are to be maintained to some extent. The details of the dynamic range conversion of content based on metadata are disclosed in the specification of Japanese Patent Application No. 2014-153320 assigned to the present applicant, for example.

Moreover, in the image display system 100 according to the present embodiment, as described with reference to FIG. 2, a case in which the source device 200 such as the BD player 3000 combines a graphics image with a reproduction image of content and then transmits the combined image to the synchronization device 300 occurs frequently. Moreover, a case in which a graphics image generated in the synchronization device 300 such as the television receiver 4000 is displayed in a state of being superimposed on the reproduction image of content may occur.

The graphics image referred herein is menus, OSD, and subtitle data, for example. In general, the graphics image of this type is generated as a SDR image having a standard luminance level (for example, 100 cd/m$^2$). For example, when the source device 200 generates a graphics image, since the reference point of the luminance 100% of the synchronization device 300 is not clear, the source device 200 generally generates a SDR graphics image.

On the other hand, when the synchronization device 300 is displaying HDR content and a graphics image generated in SDR is displayed as it is, the graphics image appears dark and it becomes difficult to see the image. Moreover, when the graphics image generated for SDR is linearly scaled according to the peak luminance of a display panel of the synchronization device 300, the graphics image appears too bright and it becomes difficult to see the image.

Therefore, in the present embodiment, when luminance information considered to be useful for display mapping of HDR content is available, the source device 200 or the synchronization device 300 converts the dynamic range of a graphics image generated for SDR to an HDR image so as to match the HDR content based on the luminance information, combines the SDR graphics image with the HDR content, and then, performs display mapping so as to match the performance (peak luminance or the like) of a destination display.

Figure 9:
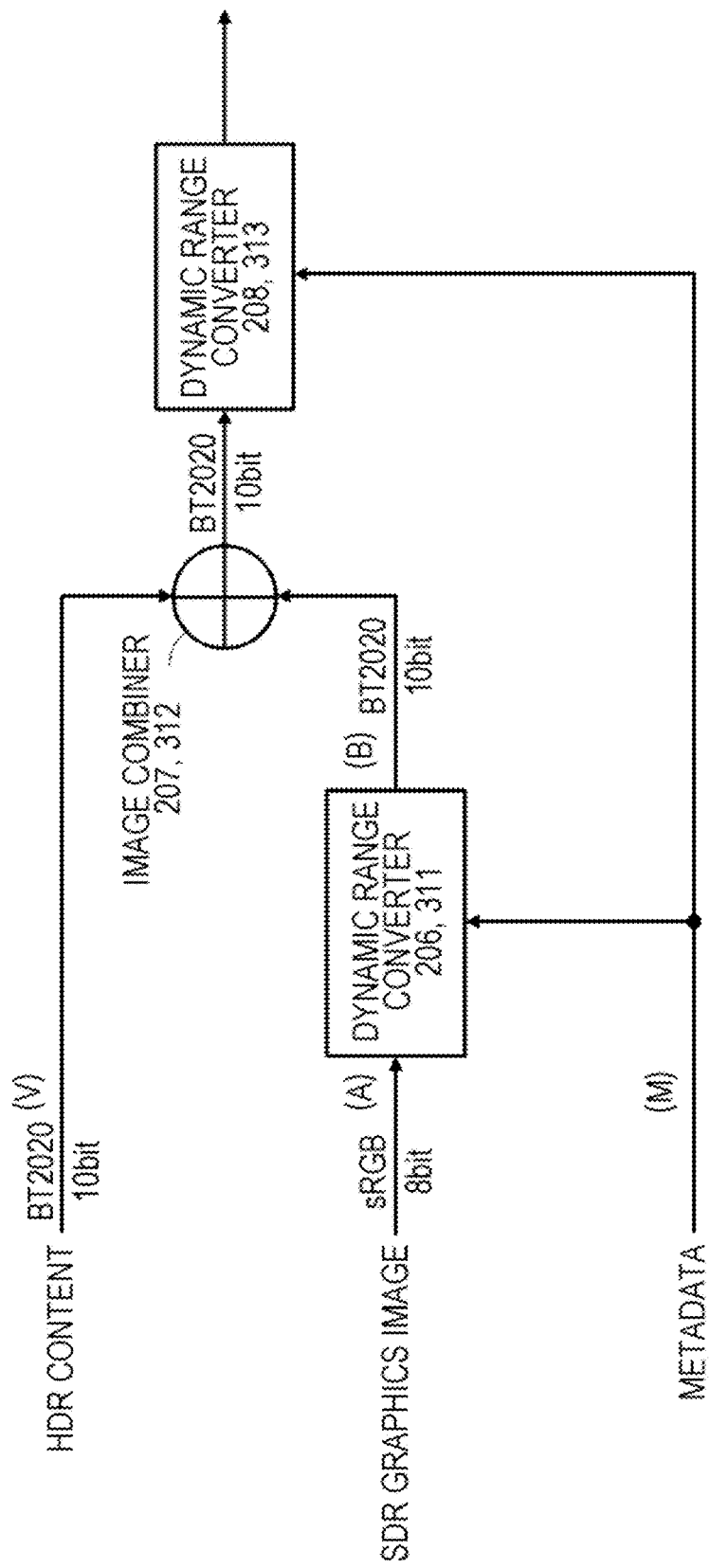
FIG. 9 is an example of a functional block diagram of combining a SDR graphics image with HDR content.

FIG. 9 illustrates an example of a functional block diagram of combining a SDR graphics image with HDR content in the source device 200 or the synchronization device 300 (which is an HDR-compatible device).

In the source device 200, the graphics generator 205 generates a graphics image (A) such as menus or OSD according to a user's input or the like obtained via the UI unit 204. Moreover, in the synchronization device 300, the graphics generator 308 generates a graphics image (A) such as menus or OSD according to a user's input or the like obtained via the UI unit 307. In any case, it is assumed that the graphics image (A) is generated for SDR.

The DR converter 206 or 311 converts the graphics image (A) generated for SDR to an HDR graphics image (B) based on luminance information included in metadata associated with the HDR content so that the dynamic range of the SDR graphics image (A) matches the HDR content. It is assumed that the SDR image is a standard RGB (sRGB) 8-bit image. Moreover, it is assumed that the HDR image is a BT2020 10-bit image. The details of the dynamic range conversion of converting a SDR graphics image to an HDR image will be described later.

The image combiner 207 or 311 combines the graphics image of which the dynamic range has been converted to HDR with the original HDR content.

The DR converter 208 or 313 converts the dynamic range of the HDR content combined with the HDR graphics image. The dynamic range conversion process performed by the dynamic range converter 313 of the synchronization device 300 aims to match (that is, display mapping) the performance (peak luminance or the like) of the display 314 and is performed based on the luminance information included in the metadata associated with the HDR content. The details of the display mapping of content based on metadata are disclosed in the specification of Japanese Patent Application No. 2014-153320 assigned to the present applicant, for example.

Figure 10:
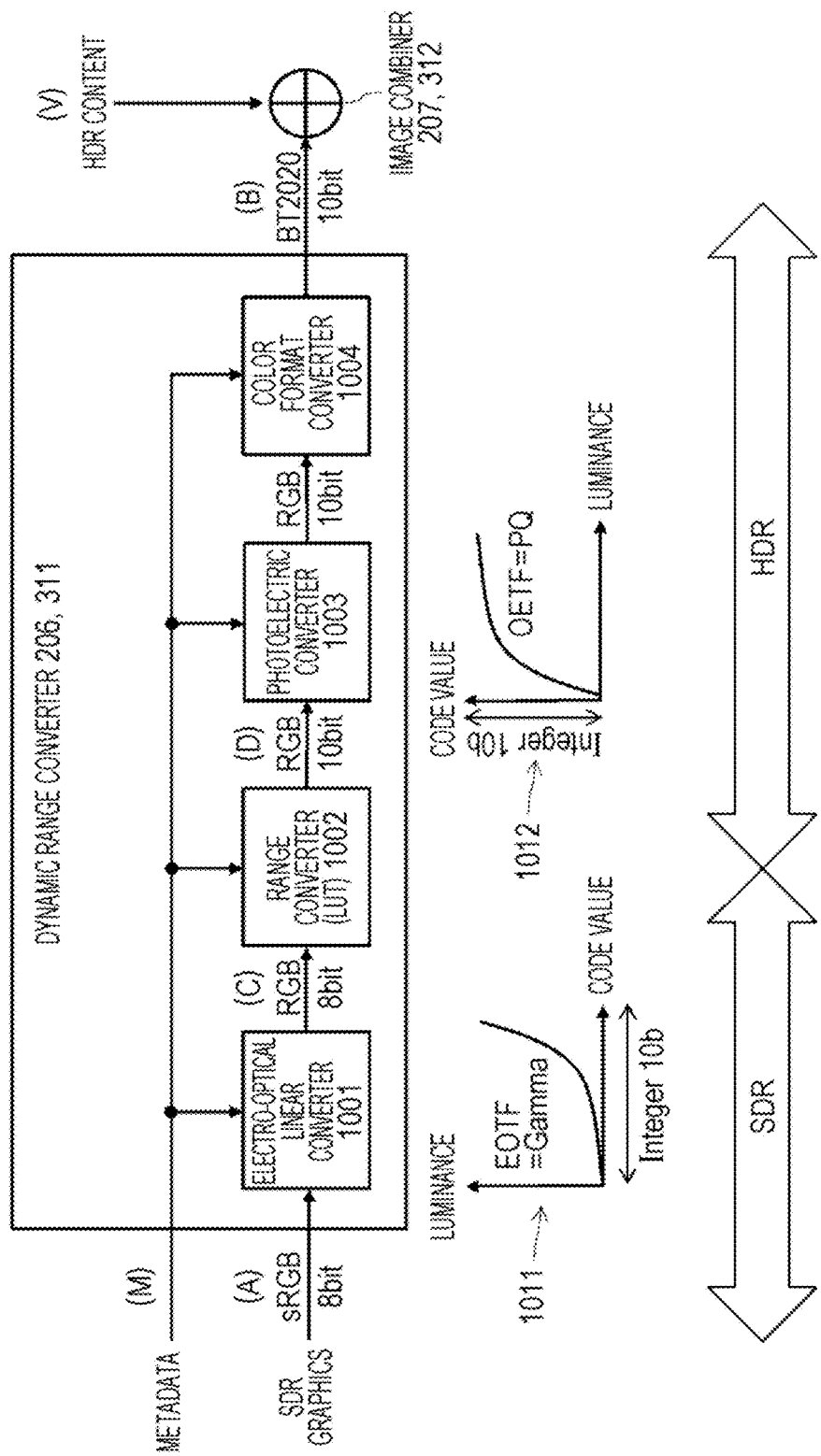
FIG. 10 is an example of a functional block diagram of processing a SDR graphics image based on metadata.

FIG. 10 illustrates an example of a functional block diagram of processing a SDR graphics image based on metadata in the dynamic range converter 206 in the source device 200 or the dynamic range converter 311 in the synchronization device 300.

It is assumed that the dynamic range converter 206 in the source device 200 or the dynamic range converter 311 in the synchronization device 300 receives stream data (V) and metadata (M) of HDR content.

Moreover, the graphics generator 205 or 308 generates the graphics image (A) such as menus or OSD according to a user's input or the like obtained via the UI unit 204 or 307. Alternatively, the graphics image (A) may be transmitted in association with the stream data (V) of container from the source device 200. In any case, it is assumed that the graphics image (A) is generated for SDR.

An electro-optical linear converter 1001 converts SDR graphics data made up of sRGB 8-bit code values, for example, to an optically linear luminance signal made up of RGB 8-bit code values using an EOTF conversion table as indicated by reference numeral 1011.

The range converter 1002 includes a lookup table (LUT) that converts the range of optically linear luminance signals. It is assumed that the metadata processor 303 sets the content of the lookup table based on the metadata indicated by the received metadata. Moreover, the range converter 1002 converts the range of the electro-optical-converted luminance signals to RGB 10-bits, for example, according to the lookup table. The subsequent signals correspond to an HDR region.

Subsequently, a nonlinear photoelectric converter 1003 nonlinearly converts the range-converted optically linear luminance signals to HDR signals (RGB 10-bit code values) that match the stream data of HDR content using an OETF conversion table indicated by reference numeral 1012.

A color format convert 1004 performs color format conversion when the gamut of the graphics image is different from that of the stream data of the HDR content. In the example illustrated in FIG. 10, the color format convert 1004 converts the RGB 10-bit HDR graphics image to a BT2020 10-bit HDR graphics image.

After that, the image combiner 207 or 312 combines the BT2020 10-bit HDR graphics image with the stream data of the HDR content.

Figure 11:
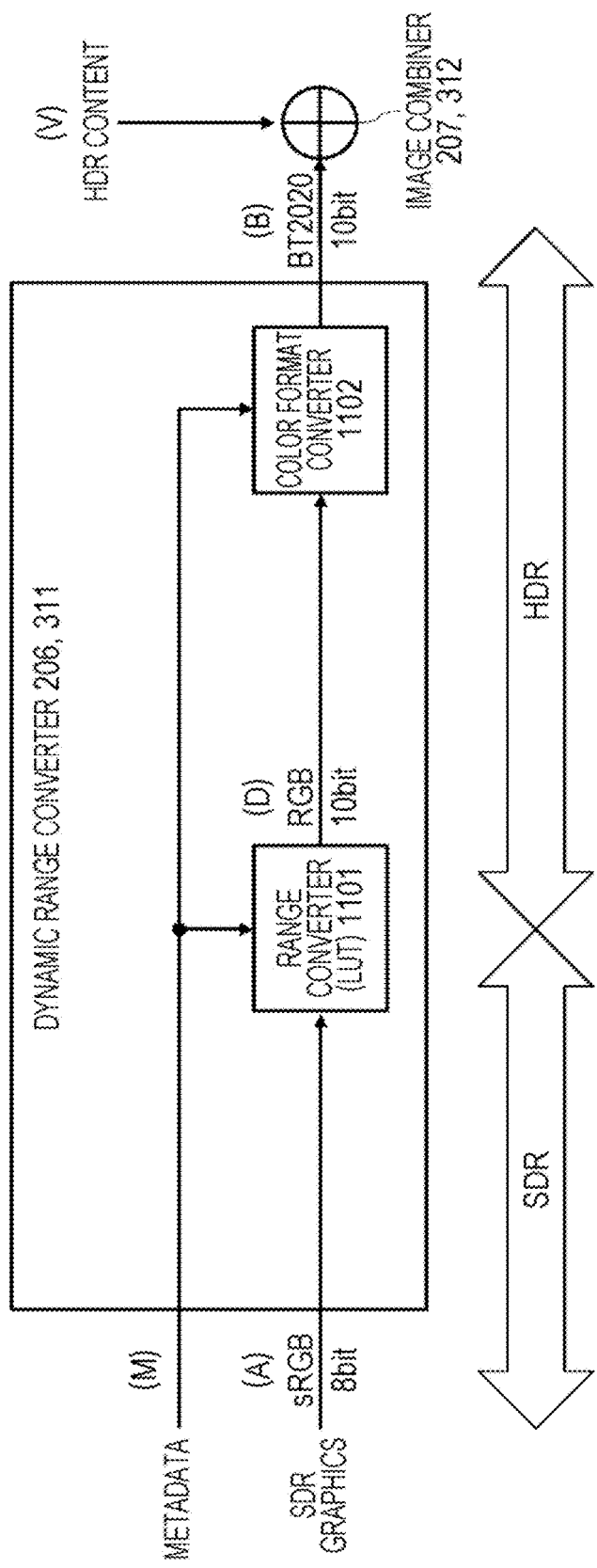
FIG. 11 is a modified example of a functional block diagram of a dynamic range converter 206 or 311 illustrated in FIG. 10.

FIG. 11 illustrates a modified example of a functional block diagram of the dynamic range converter 206 or 311 illustrated in FIG. 10. In the example illustrated in FIG. 11, a range converter 1101 is configured to perform electro-optical linear conversion, range conversion, and nonlinear photoelectric conversion at once. Moreover, when the gamut of the graphics image is different from that of the stream data of HDR content, the color format converter 1102 performs the color format conversion (the same as described above) so as to match the stream data.

Figure 12:
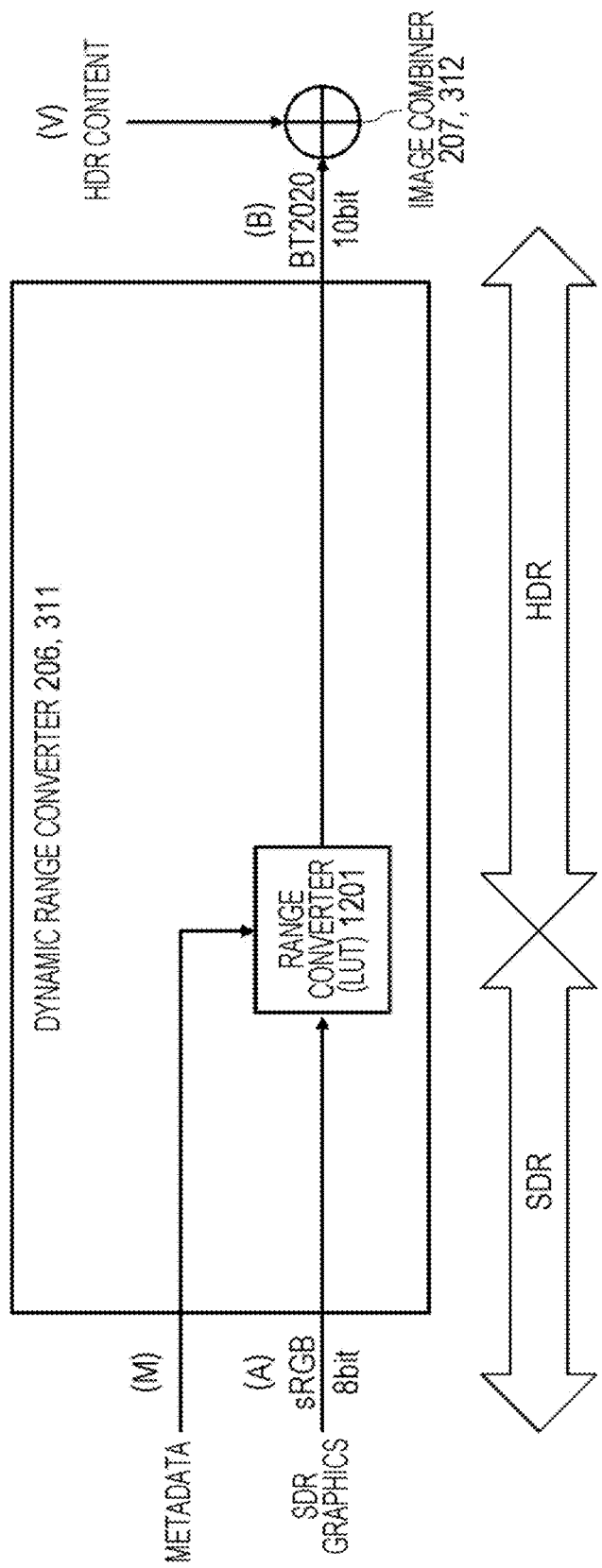
FIG. 12 is another modified example of the functional block diagram of the dynamic range converter 206 or 311 illustrated in FIG. 10.

FIG. 12 illustrates another modified example of a functional block diagram of the dynamic range converter 206 or 311 illustrated in FIG. 10. In the example illustrated in FIG. 12, a range converter 1201 is configured to perform electro-optical linear conversion, range conversion, and nonlinear photoelectric conversion at once as well as color format conversion when the color gamut is different from that of stream data.

Figure 13:
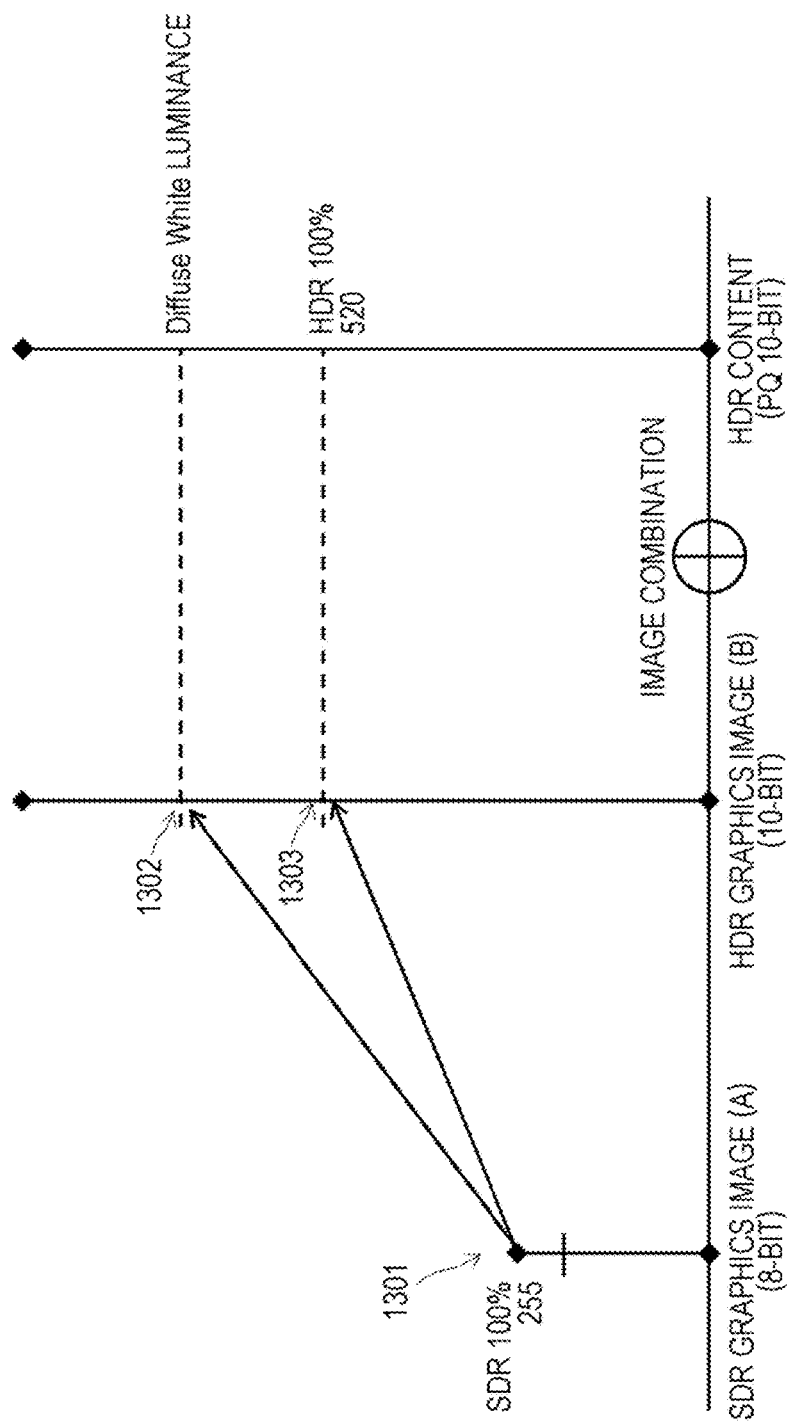
FIG. 13 is a diagram illustrating an example of range-converting (mapping) a graphics image generated for SDR to a graphics image for HDR.

FIG. 13 illustrates an example of range-converting (mapping) a graphics image generated for SDR to an HDR graphics image in the dynamic range converter 206 or 311.

In the drawing, as indicated by reference numeral 1301, the graphics image generated for SDR is a sRGB 8-bit (256-grayscale) image.

The dynamic range converter 206 or 311 range-converts (maps) the graphics image generated for SDR to an HDR graphics image. Here, when the Diffuse White luminance is designated by metadata, as indicated by reference numeral 1302, the SDR graphics image is luminance-converted to generate the HDR graphics image so that an 8-bit SDR 100% reference luminance matches the Diffuse White luminance.

Moreover, when the Diffuse White luminance is not designated by the metadata, as indicated by reference numeral 1303, the SDR graphics image is luminance-converted to generate the HDR graphics image so that an 8-bit SDR 100% reference luminance matches a 10-bit HDR 100% reference luminance.

After that, the image combiner 207 or 312 combines the HDR graphics image with the stream data of the HDR content. When the gamut of the HDR graphics image is different from that of the stream data of the HDR content, the color gamut of the HDR graphics image is converted (to BT2020 in the present embodiment) before image combination is performed. The dynamic range converter 305 converts the dynamic range of the HDR content combined with the HDR graphics image to PQ 10-bits (peak luminance 4000 [cd/m$^2$], 920 grayscales).

Figure 14:
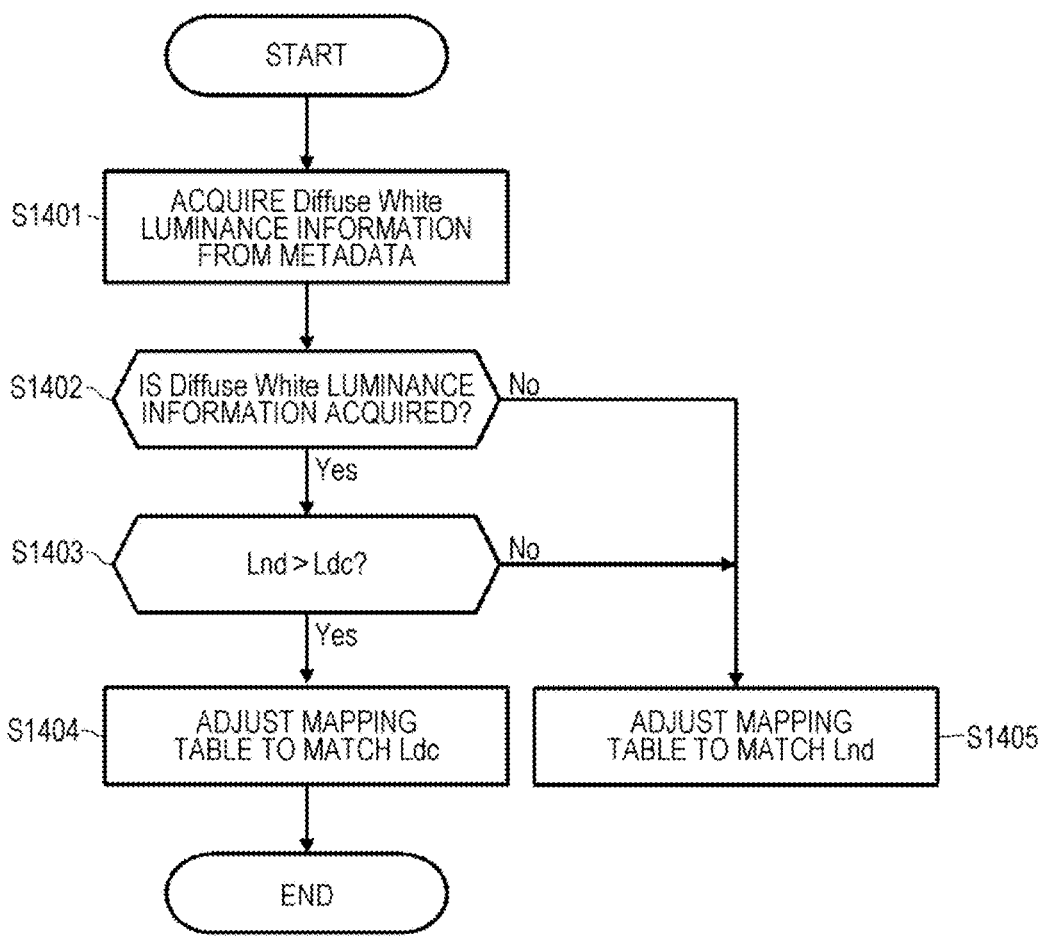
FIG. 14 is a flowchart illustrating the flow of a process of setting a mapping table for range-converting a SDR graphics image to an HDR graphics image.

FIG. 14 illustrates a flowchart of an example of the flow of a process of setting a mapping table for range-converting (mapping) a SDR graphics image to an HDR graphics image to the range converter 1002.

First, the metadata processor 203, 303, or 306 tries to acquire Diffuse White luminance information of content from metadata associated with the HDR content (step S1401). After that, it is checked whether it was possible to acquire the Diffuse White luminance information of the content (step S1402).

Figure 15:
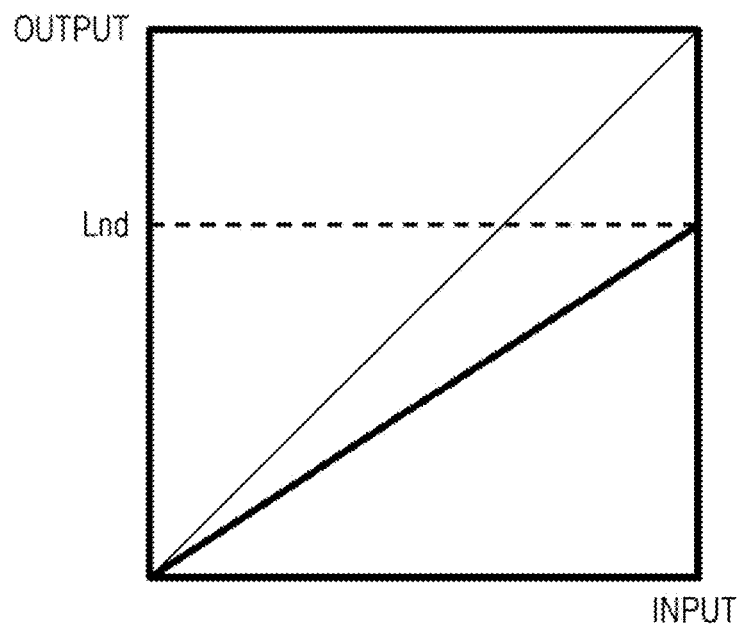
FIG. 15 is a diagram illustrating a mapping table (when it is not possible to acquire Diffuse White luminance information) for matching reference luminance Lnd of a display.

Here, when it was not possible to acquire the Diffuse White luminance information of the content (step S1402: No), as illustrated in FIG. 15, a mapping table for matching the reference luminance Lnd of a display is set to the range converter 1002 (step S1405).

When it was possible to acquire the Diffuse White luminance information of the content (step S1402: Yes), it is further checked whether the Diffuse White luminance Ldc of the content is smaller than the reference luminance Lnd of the display (step S1403).

Figure 16:
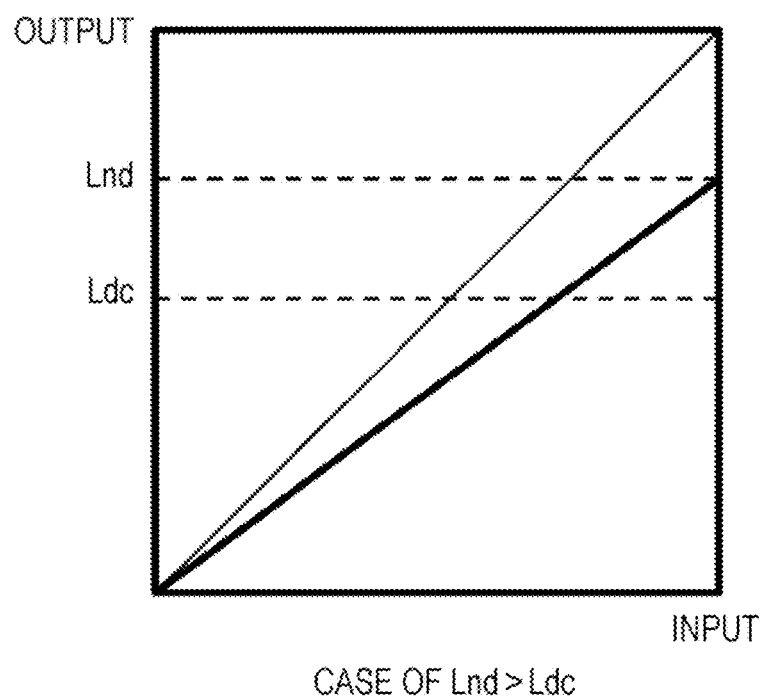
FIG. 16 is a diagram illustrating a mapping table (when (display reference luminance)>(Diffuse White luminance)) for matching reference luminance Lnd of a display.

When the Diffuse White luminance Ldc of the content is smaller than the reference luminance Lnd of the display (step S1403: Yes), as illustrated in FIG. 16, a mapping table for matching the reference luminance Lnd of the display is set to the range converter 1002 (step S1404).

Figure 17:
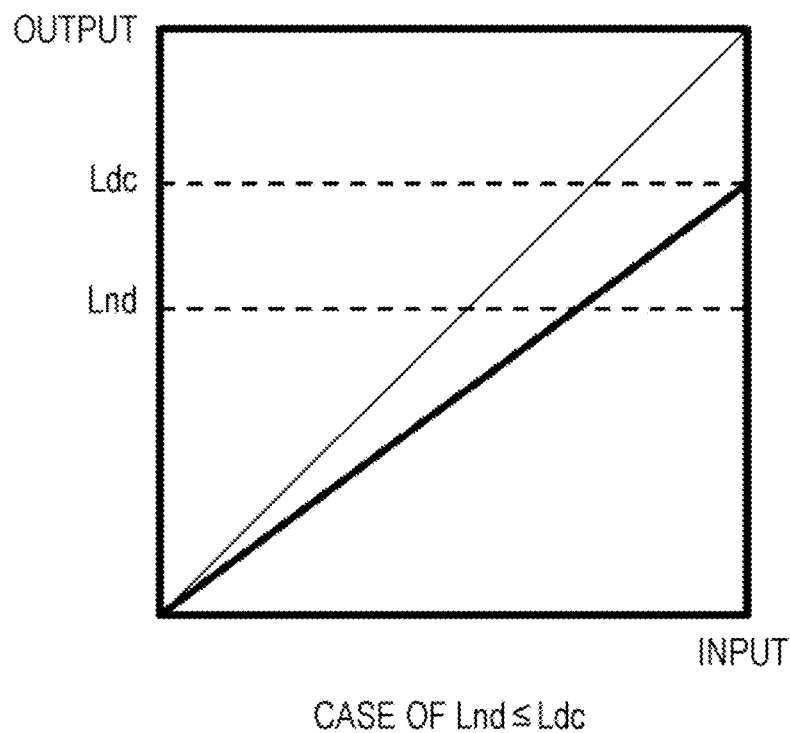
FIG. 17 is a diagram illustrating a mapping table (when (display reference luminance)≤(Diffuse White luminance)) for matching Diffuse White luminance Ldc of content.

On the other hand, when the Diffuse White luminance Ldc of the content is not smaller than the reference luminance Lnd of the display (step S1403: No), as illustrated in FIG. 17, a mapping table for matching the Diffuse White luminance Ldc of the content is set to the range converter 1002 (step S1405).

Figure 18:
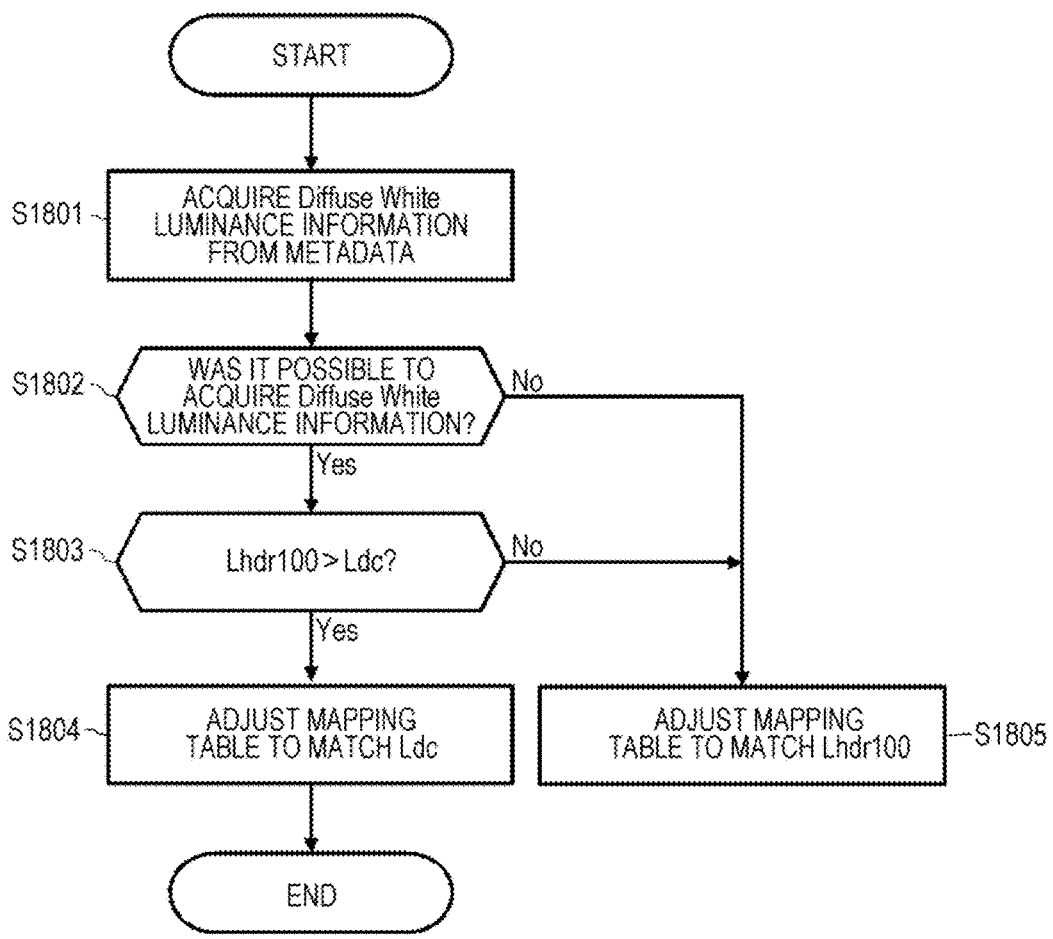
FIG. 18 is a flowchart illustrating another example of the flow of a process of range-converting a SDR graphics image to an HDR graphics image.

FIG. 18 illustrates a flowchart of another example of the flow of a process setting a mapping table for range-converting (mapping) a SDR graphics image to an HDR graphics image to the range converter 1002.

First, the metadata processor 303 tries to acquire Diffuse White luminance information of content from metadata received from the source device 200 (step S1801). After that, it is checked whether it was possible to acquire the Diffuse White luminance information of the content (step S1802).

Figure 19:
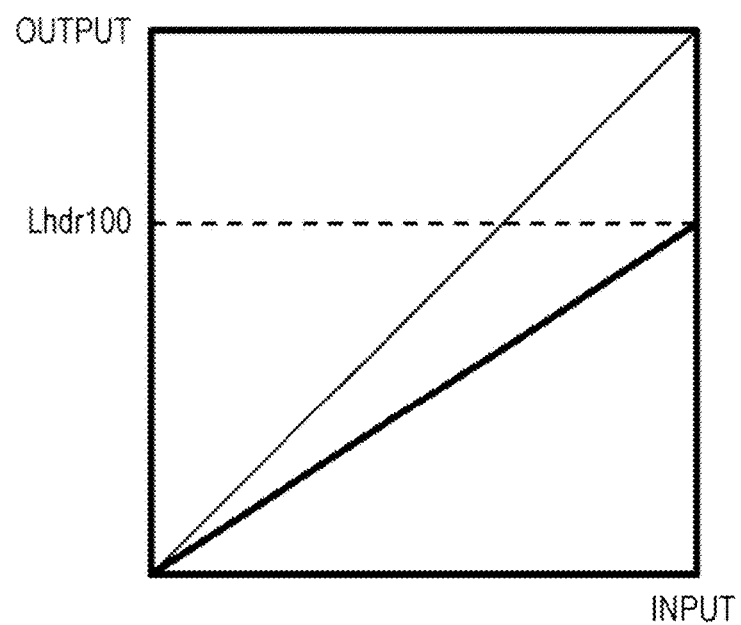
FIG. 19 is a diagram illustrating a mapping table (when it is not possible to acquire Diffuse White luminance information) for matching HDR 100% reference luminance Lhdr100.

Here, when it was not possible to acquire the Diffuse White luminance information of the content (step S1802: No), as illustrated in FIG. 19, a mapping table for matching an HDR 100% reference luminance is set to the range converter 1002 (step S1805).

Moreover, when it was possible to acquire the Diffuse White luminance information of the content (step S1802: Yes), it is further checked whether the Diffuse White luminance Ldc of the content is smaller than the HDR 100% reference luminance Lhdr100 (step S1803).

Figure 20:
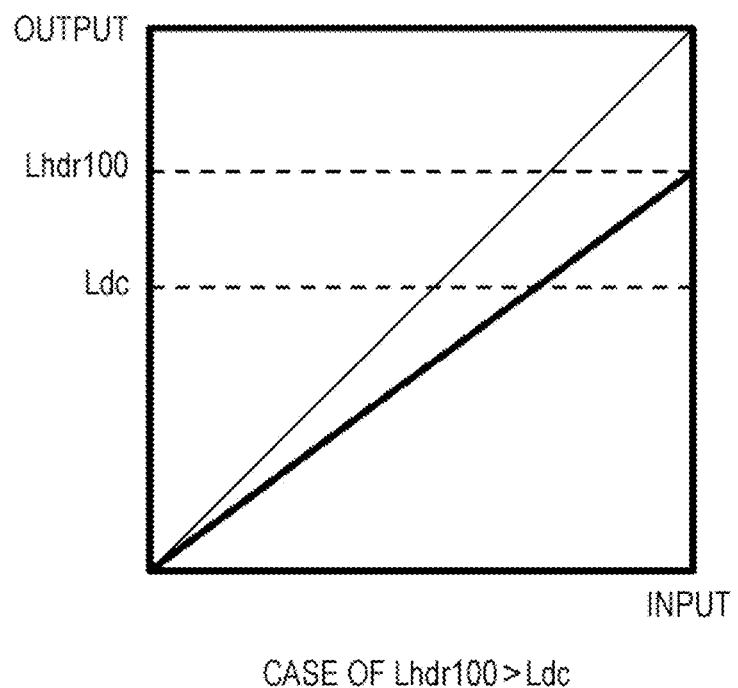
FIG. 20 is a diagram illustrating a mapping table (when (HDR 100% reference luminance Lhdr100)>(Diffuse White luminance)) for matching HDR 100% reference luminance Lhdr100c.

Moreover, when the Diffuse White luminance Ldc of the content is smaller than the HDR 100% reference luminance Lhdr100 (step S1803: Yes), as illustrated in FIG. 20, a mapping table for matching the HDR 100% reference luminance Lhdr100 is set to the range converter 1002 (step S1904).

Figure 21:
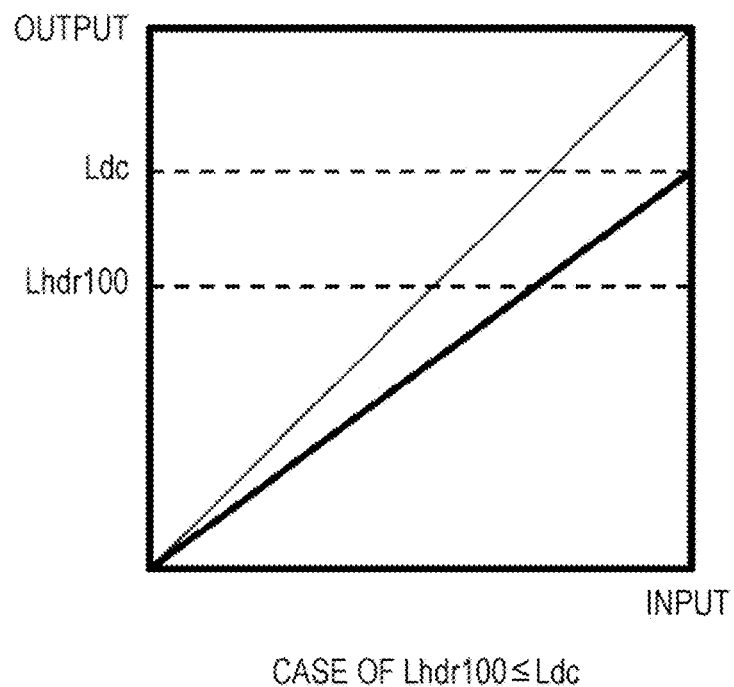
FIG. 21 is a diagram illustrating a mapping table (when (HDR 100% reference luminance Lhdr100)≤(Diffuse White luminance)) for matching Diffuse White luminance Ldc of content.

On the other hand, when the Diffuse White luminance Ldc of the content is not smaller than the HDR 100% reference luminance Lhdr100 (step S1803: No), as illustrated in FIG. 21, a mapping table for matching the Diffuse White luminance Ldc of the display panels is set to the range converter 1002 (step S1805).

Finally, a method of converting the dynamic range of the HDR content combined with the HDR graphics image in the DR converter 305 will be described. The dynamic range conversion performed herein aims to match the performance (peak luminance or the like) of the display 309 (that is, aims to realize display mapping) and is performed based on the metadata information output from the source device 200.

Figure 22:
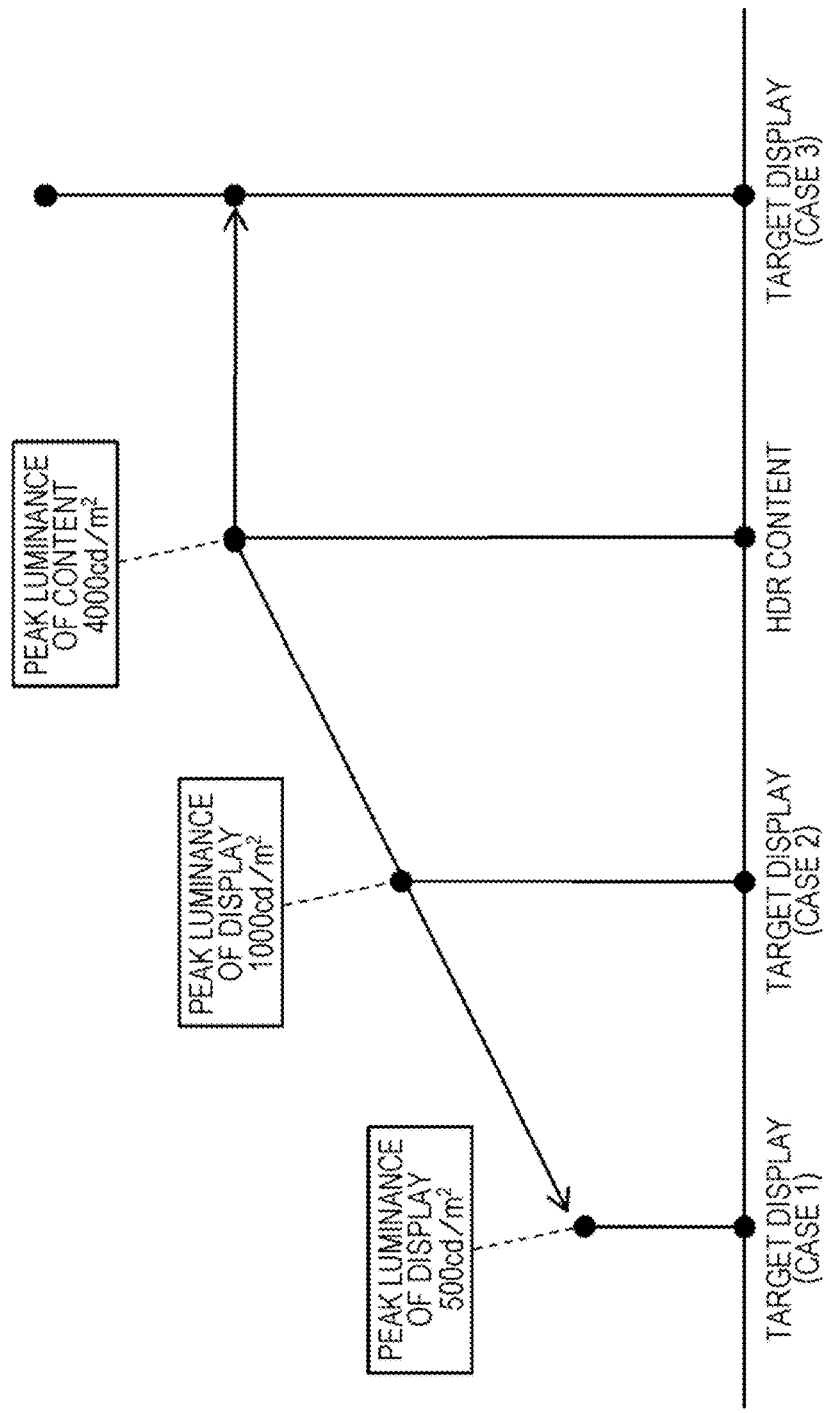
FIG. 22 is a diagram illustrating an example (a case where only peak luminance of content is used) of performing display mapping on HDR content.

FIG. 22 illustrates an example of performing display mapping on combined HDR content (a case of using the peak luminance of content only). In the drawing, examples of display-mapping HDR content having the peak luminance of specific content to three target displays having different peak luminance values are also illustrated.

It is assumed that target HDR content to be processed has a peak luminance of 4000 cd/m$^2$. These items of luminance information are transmitted to the synchronization device 300 together with the stream data in a transmission container such as knee_function_info SEI (this has been described above).

A target display of Case 1 has a peak luminance of 500 cd/m$^2$ which is lower than the peak luminance of content. Thus, display mapping is performed on HDR content so that a luminance signal equal to or lower than the peak luminance of the display is compressed up to the peak luminance of the display.

Moreover, a target display of Case 2 has a peak luminance of 1000 cd/m$^2$ which is lower than the peak luminance of content similarly to the above. Thus, display mapping is performed on HDR content so that a luminance signal equal to or lower than the peak luminance of the display is compressed up to the peak luminance of the display.

Moreover, a target display of Case 3 has a peak luminance of 5000 cd/m² which is higher than the peak luminance of HDR content. In this case, the luminance of the HDR content is maintained for all luminance levels.

Figure 23:
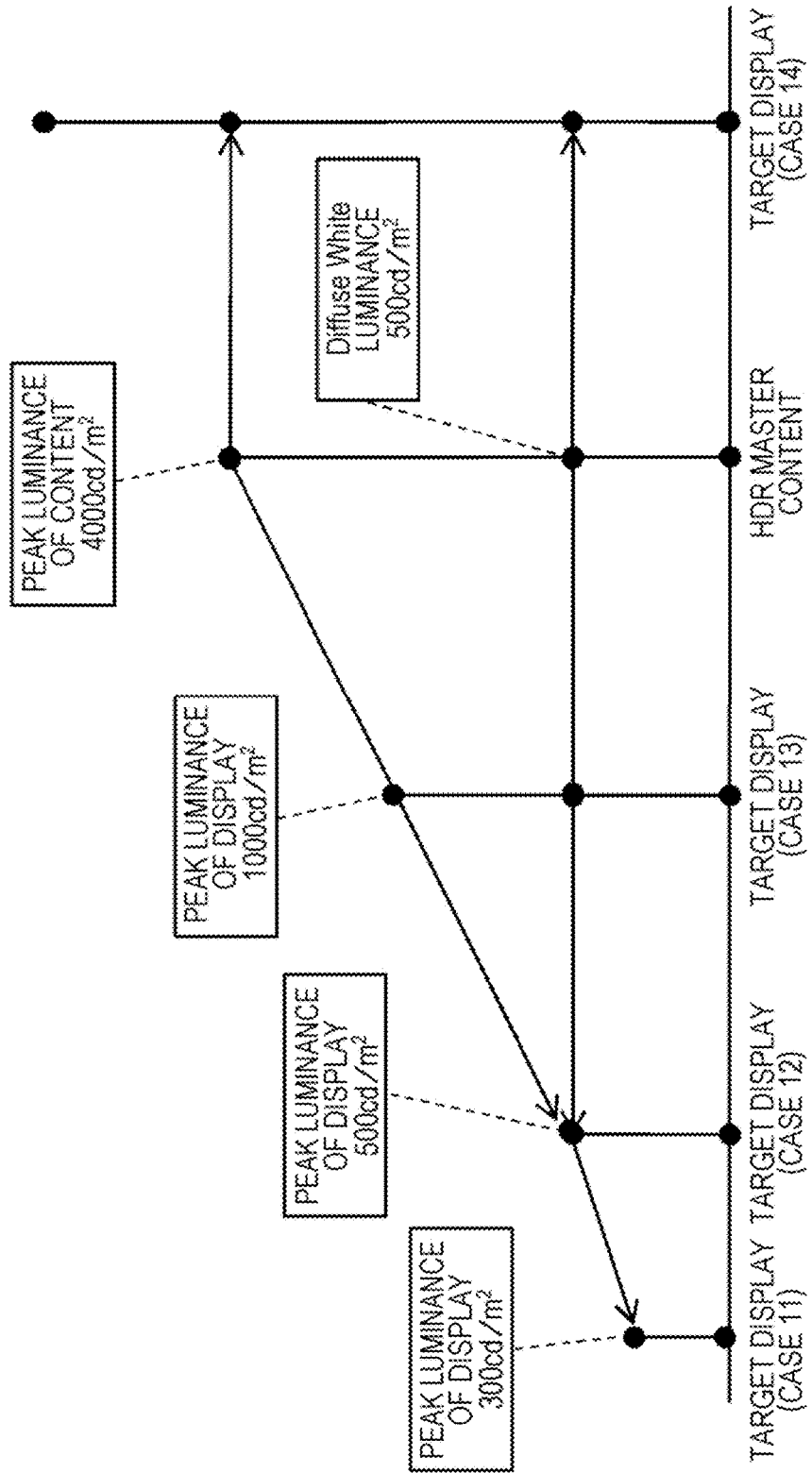
FIG. 23 is a diagram illustrating another example (a case where peak luminance and Diffuse White luminance of content are used) of performing display mapping on HDR content.

Moreover, FIG. 23 illustrates another example (a case where peak luminance and Diffuse White luminance of content are used) of performing display mapping on combined HDR content. In the drawing, examples of performing display-mapping HDR content having the peak luminance and Diffuse White luminance of specific content to four target displays having different peak luminance values are also illustrated.

It is assumed that target HDR content to be processed has a peak luminance of 4000 cd/m² and a Diffuse White luminance of 500 cd/m². These items of luminance information are transmitted to the synchronization device 300 together with the stream data in a transmission container such as knee_function_info SEI (this has been described above).

A target display of Case 11 has a peak luminance of 300 cd/m² which is lower than the Diffuse White luminance of the HDR content. Thus, display mapping is performed on HDR content so that a luminance signal equal to or lower than the peak luminance of the display is compressed up to the peak luminance of the display.

A target display of Case 12 has a peak luminance of 500 cd/m² which is identical to the Diffuse White luminance of the HDR content. Thus, display mapping is performed on the HDR content so that a luminance signal equal to or higher than the Diffuse White luminance is linearly or nonlinearly compressed up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

Moreover, a target display of Case 13 has a peak luminance of 1000 cd/m² which is lower than the peak luminance of the HDR content but is higher than the Diffuse White luminance. Thus, display mapping is performed on the HDR content so that a luminance signal equal to or higher than the Diffuse White luminance is linearly or nonlinearly compressed up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

Moreover, a target display of Case 14 has a peak luminance of 3000 cd/m² which is higher than the peak luminance of the HDR content. In this case, the luminance of the HDR content is maintained for all luminance levels. Alternatively, display mapping is performed on the HDR content so that a luminance signal equal to or higher than the Diffuse White luminance is linearly or nonlinearly extended up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

Figure 24:
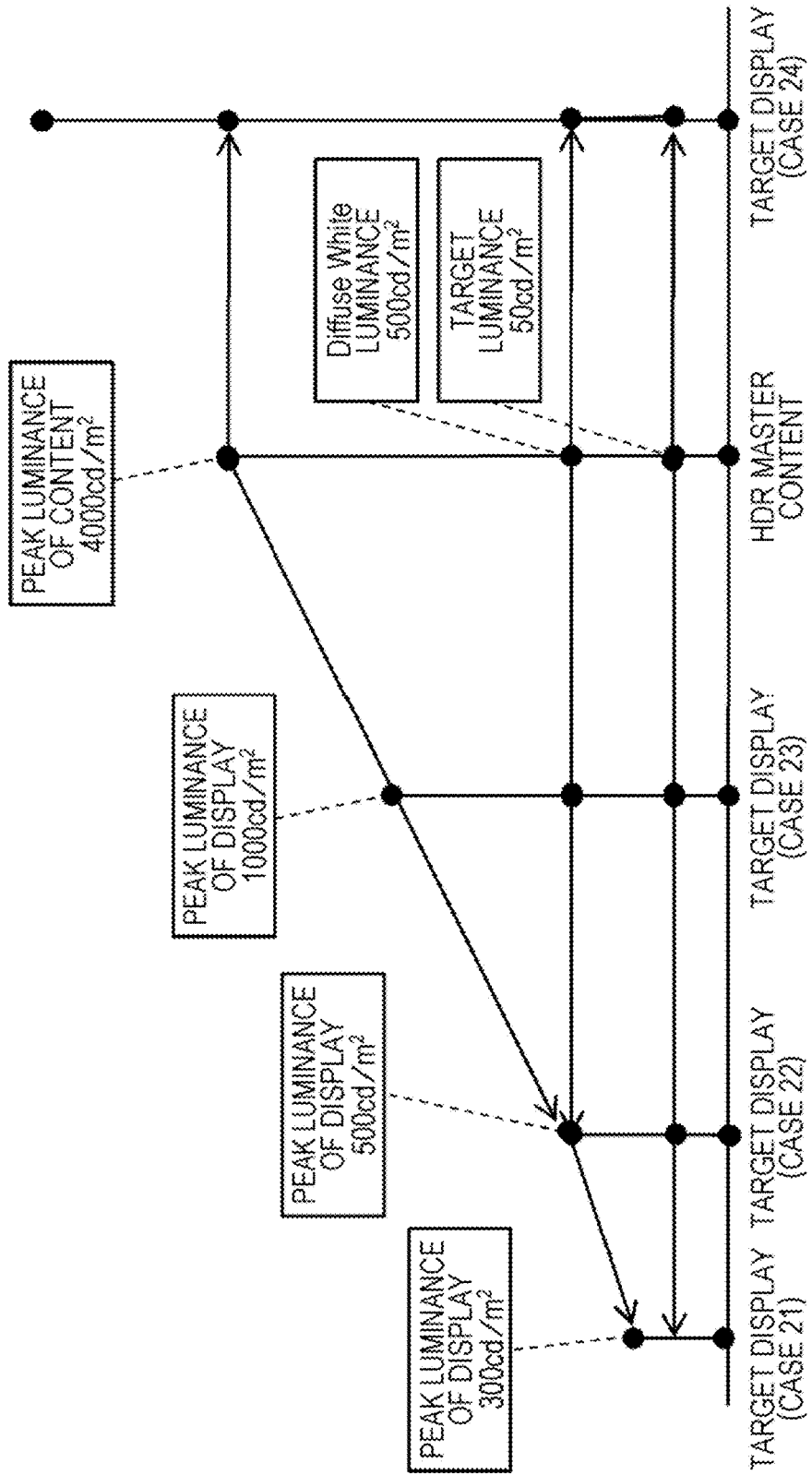
FIG. 24 is a diagram illustrating another example (a case where peak luminance, Diffuse White luminance, and target luminance of content are used) of performing display mapping on HDR content.

FIG. 24 illustrates another example (a case where peak luminance, Diffuse White luminance, and target luminance of content are used) of performing display mapping on combined HDR content.

It is assumed that target HDR content to be processed has a peak luminance of 4000 cd/m², a Diffuse White luminance of 500 cd/m², and a target luminance of 50 cd/m². These items of luminance information are transmitted to the image reception device 300 together with the stream data in a transmission container such as knee_function_info SEI (this has been described above).

A target display of Case 21 has a peak luminance of 300 cd/m² which is lower than the Diffuse White luminance of the HDR content but is higher than the target luminance. Thus, display mapping is performed on the HDR content so that a luminance signal equal to or higher than the peak luminance of the display is linearly or nonlinearly compressed up to the peak luminance of the display while maintaining the luminance level equal to or lower than the target luminance (alternatively, maintaining luminance values equal to or lower than a target luminance completely and maintaining luminance values between the target luminance and the Diffuse White luminance to some extent).

A target display of Case 22 has a peak luminance of 500 cd/m² which is identical to the Diffuse White luminance of the HDR content. Thus, display mapping is performed on the HDR content so that a luminance signal equal to or higher than the Diffuse White luminance is linearly or nonlinearly compressed up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

Moreover, a target display of Case 23 has a peak luminance of 1000 cd/m² which is lower than the peak luminance of the HDR content but is higher than the Diffuse White luminance. Thus, display mapping is performed on the HDR content so that a luminance signal equal to or higher than the Diffuse White luminance is linearly or nonlinearly compressed up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

Moreover, a target display of Case 24 has a peak luminance of 3000 cd/m² which is higher than the peak luminance of the HDR content. In this case, the luminance of the HDR content is maintained for all luminance levels. Alternatively, display mapping is performed on the HDR content so that a luminance signal equal to or higher than the Diffuse White luminance is linearly or nonlinearly extended up to the peak luminance of the display while maintaining the luminance level equal to or lower than the Diffuse White luminance (alternatively, maintaining luminance values equal to or lower than a target luminance completely and maintaining luminance values between the target luminance and the Diffuse White luminance to some extent).

The details of the dynamic range conversion of HDR content based on metadata are disclosed in the specification of Japanese Patent Application No. 2014-153320 assigned to the present applicant, for example.

INDUSTRIAL APPLICABILITY

The techniques disclosed herein have been described in detail above with reference to certain embodiments. It should be, however, obvious that those skilled in the art can modify or replace those embodiments with other embodiments without departing from the scope of the techniques disclosed herein.

In the present specification, although an embodiment applied to an image display system that reproduces and displays HDR content such as UHD-BD has been mainly described, the gist of the techniques disclosed in the present specification is not limited thereto. The techniques disclosed in the present specification can be applied to various other systems that transmit or display HDR content such as, for example, a webcasting service such as OTT or a digital broadcasting service.

In the present specification, although an embodiment in which the synchronization device performs display mapping on an SDR graphics image has been mainly described, an embodiment in which the source device performs the same display mapping is also possible.

In short, the techniques have been disclosed in the form of examples, and the description of the specification should not be interpreted in a limited manner. The claims should be taken into account in understanding the subject matter of the techniques disclosed herein.

The techniques disclosed herein can also have the following structures.

(1) An image processing apparatus including:
a metadata acquiring unit that acquires metadata of image data; and
a processor that processes a graphics image to be superimposed on the image data based on the metadata.

(2) The image processing apparatus according to (1), wherein
the metadata acquiring unit acquires a Diffuse White luminance indicating a luminance value of white serving as a reference of the image data as the metadata, and the processor adjusts a luminance of the graphics image based on the Diffuse White luminance.

(3) The image processing apparatus according to (2), wherein
the processor compares the Diffuse White luminance with a reference luminance of a display that displays the image data and adjusts the luminance of the graphics image based on the larger luminance information.

(4) The image processing apparatus according to (3), wherein
the processor adjusts the luminance of the graphics image based on the reference luminance of the display when the metadata acquiring unit is unable to acquire the Diffuse White luminance of the image data.

(5) The image processing apparatus according to (2), wherein
the processor compares the Diffuse White luminance with a reference luminance of a dynamic range of a predetermined luminance and adjusts the luminance of the graphics image based on the larger luminance information.

(6) The image processing apparatus according to (5), wherein
the processor adjusts the luminance of the graphics image based on the reference luminance of the dynamic range of the predetermined luminance when the metadata acquiring unit is unable to acquire the Diffuse White luminance of the image data.

(7) The image processing apparatus according to any one of (1) to (6), further including:
a combiner that combines the graphics image processed by the processor with image data.

(8) The image processing apparatus according to (7), further including:
a dynamic range converter that adjusts a dynamic range of the luminance of the image data combined with the graphics image so as to match a display that displays the image data.

(9) The image processing apparatus according to (8), wherein
the metadata acquiring unit acquires at least one of information on a Diffuse White luminance indicating a luminance value of white serving as a reference of the image data or information on a target luminance indicating a luminance value of a main or target object of the image data (for each scene) as metadata, and the dynamic range converter adjusts the dynamic range of the luminance of the image data so as to maintain the Diffuse White luminance or the target luminance.

(10) The image processing apparatus according to (8), wherein
the metadata acquiring unit acquires information on the peak luminance of the image data as the metadata, and
the dynamic range converter compresses the peak luminance of the image data up to a peak luminance of the display when the peak luminance of the image data is larger than the peak luminance of the display.

(11) The image processing apparatus according to (8), wherein
the metadata acquiring unit acquires information on the peak luminance of the image data and information on the Diffuse White luminance indicating the luminance value of white serving as the reference of the image data as the metadata, and
when the peak luminance of the image data is larger than the peak luminance of the display, the dynamic range converter compresses the peak luminance of the image data up to the peak luminance of the display and compresses a luminance between the peak luminance and the Diffuse White luminance while maintaining the luminance equal to or lower than the Diffuse White luminance.

(12) The image processing apparatus according to (8), wherein
the metadata acquiring unit acquires information on a peak luminance of the image data and information on a target luminance indicating a luminance value of a main or target object of the image data as metadata, and
when the peak luminance of the image data is larger than the peak luminance of the display, the dynamic range converter compresses the peak luminance of the image data up to the peak luminance of the display and compresses a luminance between the peak luminance and the target luminance while maintaining the luminance equal to or lower than the target luminance.

(13) The image processing apparatus according to (8), wherein
the metadata acquiring unit acquires information on a peak luminance of the image data, information on a Diffuse White luminance indicating a luminance value of white serving as a reference of the image data, and information on a target luminance indicating a luminance value of a main or target object of the image data as metadata, and
when the Diffuse White luminance is larger than the peak luminance of the display, the dynamic range converter compresses the peak luminance of the image data up to the peak luminance of the display and compresses a luminance between the peak luminance and the target luminance while maintaining the luminance equal to or lower than the peak luminance.

(14) An image processing method including steps of:
acquiring metadata of image data; and
processing a graphics image to be superimposed on the image data based on the metadata.

REFERENCE SIGNS LIST

100 Image display system
200 Source device
201 Storage medium
202 Content decoder
203 Metadata processor
204 UI unit
205 Graphics generator
206 Dynamic range (DR) converter
207 Image combiner
208 Dynamic range (DR) converter
209 Transmitter
300 Synchronization device
301 Receiver
302 Content processor
303 Metadata processor
304 Content receiver
305 Content decoder
306 Metadata processor
307 UI unit
308 Graphics generator
309 Signal selector
310 Signal selector
311 Dynamic range (DR) converter
312 Image combiner
313 Dynamic range (DR) converter
314 Display
1001 Electro-optical linear converter
1002 Range converter
1003 Nonlinear photoelectric converter
1004 Color format convert
1101 Range converter
1102 Color format converter
1201 Range converter
3000 BD player
3001 CPU
3002 Internal bus
3003 Flash ROM
3004 SDRAM
3005 Remote controller receiver
3006 Remote controller transmitter
3007 Storage medium interface
3008 BD drive
3009 HDD
3010 MPEG decoder
3011 Graphic generation circuit
3012 Image output terminal
3013 Audio output terminal
3014 Display controller
3015 Panel driving circuit
3016 Display panel
3017 Power supply
3018 SSD
3019 HDMI (registered trademark) transmitter
3019a HDMI (registered trademark) terminal
4000 Television receiver
4001 Antenna terminal
4002 Digital tuner
4003 MPEG decoder
4004 Image signal processing circuit
4005 Graphic generation circuit
4006 Panel driving circuit
4007 Display panel
4008 Audio signal processing circuit
4009 Audio amplifying circuit
4010 Speaker
4011 Internal bus
4012 CPU
4013 Flash ROM
4014 SDRAM
4015 Remote controller receiver
4016 Remote controller transmitter
4017 Wireless transceiver
4018 Display controller
4019 Power supply
4020 HDMI (registered trademark) receiver
4020a HDMI (registered trademark) terminal

The invention claimed is:

1. An image processing apparatus comprising:
a metadata acquiring unit that acquires metadata of image data; and
a processor that processes a graphics image to be superimposed on the image data based on the metadata,
wherein
the metadata acquiring unit acquires a reference white luminance indicating a luminance value of white serving as a reference of the image data as the metadata, and
the processor adjusts a luminance of the graphics image based on the reference white luminance.

2. The image processing apparatus according to claim 1, wherein
the processor compares the reference white luminance with a reference luminance of a display that displays the image data and adjusts the luminance of the graphics image based on the larger luminance information.

3. The image processing apparatus according to claim 1, wherein
the processor adjusts the luminance of the graphics image based on the reference luminance of the display when the metadata acquiring unit is unable to acquire the reference white luminance of the image data.

4. The image processing apparatus according to claim 1, wherein
the processor compares the reference white luminance with a reference luminance of a dynamic range of a predetermined luminance and adjusts the luminance of the graphics image based on the larger luminance information.

5. The image processing apparatus according to claim 4, wherein
the processor adjusts the luminance of the graphics image based on the reference luminance of the dynamic range of the predetermined luminance when the metadata acquiring unit is unable to acquire the reference white luminance of the image data.

6. The image processing apparatus according to claim 1, further comprising:
a combiner that combines the graphics image processed by the processor with the image data; and
a dynamic range converter that adjusts a dynamic range of luminance of the image data combined with the graphics image so as to match a display that displays the image data,
wherein
the metadata acquiring unit acquires at least one of information on the reference white luminance indicating the luminance value of white serving as the reference of the image data or information on a target luminance indicating a luminance value of a main or target object of the image data as the metadata, and the dynamic range converter adjusts the dynamic range of the luminance of the image data so as to maintain the reference white luminance or the target luminance.

7. The image processing apparatus according to claim 1, further comprising:

a combiner that combines the graphics image processed by the processor with the image data; and a dynamic range converter that adjusts a dynamic range of luminance of the image data combined with the graphics image so as to match a display that displays the image data, wherein the metadata acquiring unit acquires information on a peak luminance of the image data and information on the reference white luminance indicating the luminance value of white serving as the reference of the image data as the metadata, and when the peak luminance of the image data is larger than a peak luminance of the display, the dynamic range converter compresses the peak luminance of the image data up to the peak luminance of the display and compresses a luminance value between the peak luminance of the image data and the reference white luminance while maintaining the luminance value equal to or lower than the reference white luminance.

8. The image processing apparatus according to claim 1, further comprising:

a combiner that combines the graphics image processed by the processor with the image data; and a dynamic range converter that adjusts a dynamic range of the luminance of the image data combined with the graphics image so as to match a display that displays the image data, wherein the metadata acquiring unit acquires information on a peak luminance of the image data and information on a target luminance indicating a luminance value of a main or target object of the image data as the metadata, and when the peak luminance of the image data is larger than a peak luminance of the display, the dynamic range converter compresses the peak luminance of the image data up to the peak luminance of the display and compresses a luminance value between the peak luminance of the image data and the target luminance while maintaining the luminance value equal to or lower than the target luminance.

9. The image processing apparatus according to claim 1, further comprising:

a combiner that combines the graphics image processed by the processor with the image data; and a dynamic range converter that adjusts a dynamic range of luminance of the image data combined with the graphics image so as to match a display that displays the image data, wherein the metadata acquiring unit acquires information on a peak luminance of the image data, information on the reference white luminance indicating the luminance value of white serving as the reference of the image data, and information on a target luminance indicating a luminance value of a main or target object of the image data the metadata, and when the reference white luminance is larger than a peak luminance of the display, the dynamic range converter compresses the peak luminance of the image data up to the peak luminance of the display and compresses a luminance value between the peak luminance of the image data and the target luminance while maintaining the luminance value equal to or lower than the peak luminance.

10. An image processing method comprising:

acquiring metadata of image data;

processing a graphics image to be superimposed on the image data based on the metadata;

acquiring a reference white luminance indicating a luminance value of white serving as a reference of the image data as the metadata; and adjusting a luminance of the graphics image based on the reference white luminance.

11. The image processing method according to claim 10, further comprising:

comparing the reference white luminance with a reference luminance of a display that displays the image data and adjusting the luminance of the graphics image based on the larger luminance information.

12. The image processing method according to claim 10, further comprising:

adjusting the luminance of the graphics image based on the reference luminance of the display when the reference white luminance of the image data is unable to be acquired.

13. The image processing method according to claim 10, further comprising:

comparing the reference white luminance with a reference luminance of a dynamic range of a predetermined luminance and adjusting the luminance of the graphics image based on the larger luminance information.

14. The image processing method according to claim 13, further comprising:

adjusting the luminance of the graphics image based on the reference luminance of the dynamic range of the predetermined luminance when the reference white luminance of the image data is unable to be acquired.

15. The image processing method according to claim 10, further comprising:

combining the graphics image with the image data;

adjusting a dynamic range of luminance of the image data combined with the graphics image so as to match a display that displays the image data;

acquiring at least one of information on the reference white luminance indicating the luminance value of white serving as the reference of the image data or information on a target luminance indicating a luminance value of a main or target object of the image data as the metadata; and adjusting the dynamic range of the luminance of the image data so as to maintain the reference white luminance or the target luminance.

16. The image processing method according to claim 10, further comprising:

combining the graphics image with the image data;

adjusting a dynamic range of luminance of the image data combined with the graphics image so as to match a display that displays the image data;

acquiring information on a peak luminance of the image data and information on the reference white luminance indicating the luminance value of white serving as the reference of the image data as the metadata; and when the peak luminance of the image data is larger than a peak luminance of the display, compressing the peak luminance of the image data up to the peak luminance of the display and compressing a luminance value between the peak luminance of the image data and the reference white luminance while maintaining the luminance value equal to or lower than the reference white luminance.

17. The image processing method according to claim 10, further comprising:

combining the graphics image with the image data;

adjusting a dynamic range of the luminance of the image data combined with the graphics image so as to match a display that displays the image data;

acquiring information on a peak luminance of the image data and information on a target luminance indicating a luminance value of a main or target object of the image data as the metadata; and when the peak luminance of the image data is larger than a peak luminance of the display, compressing the peak luminance of the image data up to the peak luminance of the display and compressing a luminance value between the peak luminance of the image data and the target luminance while maintaining the luminance value equal to or lower than the target luminance.

18. The image processing method according to claim 10, further comprising:

combining the graphics image with the image data;

adjusting a dynamic range of luminance of the image data combined with the graphics image so as to match a display that displays the image data;

acquiring information on a peak luminance of the image data, information on the reference white luminance indicating the luminance value of white serving as the reference of the image data, and information on a target luminance indicating a luminance value of a main or target object of the image data the metadata; and when the reference white luminance is larger than a peak luminance of the display, compressing the peak luminance of the image data up to the peak luminance of the display and compressing a luminance value between the peak luminance of the image data and the target luminance while maintaining the luminance value equal to or lower than the peak luminance.

19. A non-transitory storage medium on which is recorded a program executable by a computer, the program comprising:

acquiring metadata of image data;

processing a graphics image to be superimposed on the image data based on the metadata;

acquiring a reference white luminance indicating a luminance value of white serving as a reference of the image data as the metadata; and adjusting a luminance of the graphics image based on the reference white luminance.

* * * * *